(12) United States Patent
Sasaki

(10) Patent No.: US 7,613,867 B2
(45) Date of Patent: Nov. 3, 2009

(54) INFORMATION RECORDING APPARATUS, INFORMATION RECORDING METHOD AND RECORDING MEDIUM RECORDING PROGRAM

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 428 days.

(21) Appl. No.: 10/578,707

(22) PCT Filed: Jul. 30, 2004

(86) PCT No.: PCT/JP2004/010948

§ 371 (c)(1),
(2), (4) Date: Oct. 11, 2006

(87) PCT Pub. No.: WO2005/045827

PCT Pub. Date: May 19, 2005

(65) Prior Publication Data

US 2007/0143538 A1 Jun. 21, 2007

(30) Foreign Application Priority Data

Nov. 11, 2003 (JP) .............................. 2003-381644

(51) Int. Cl.
*G06F 12/00* (2006.01)
(52) U.S. Cl. ...................... 711/100; 711/112; 711/113; 711/170; 386/46
(58) Field of Classification Search ................ 711/100, 711/112, 113, 170, 173; 386/46
See application file for complete search history.

(56) References Cited

U.S. PATENT DOCUMENTS

| | | | |
|---|---|---|---|
| 5,687,150 A | | 11/1997 | Nonaka et al. |
| 6,151,660 A | * | 11/2000 | Aoki .......................... 711/129 |
| 6,330,214 B1 | | 12/2001 | Ohta et al. |
| 6,388,968 B1 | | 5/2002 | Ohta et al. |
| 6,661,964 B1 | | 12/2003 | Otsuka |
| 2003/0133542 A1 | | 7/2003 | Takahashi et al. |
| 2004/0258400 A1 | * | 12/2004 | Yamaoka et al. ............. 386/113 |

FOREIGN PATENT DOCUMENTS

| | | |
|---|---|---|
| JP | 05-135548 | 6/1993 |
| JP | 07-093912 | 4/1995 |
| JP | 08-106722 | 4/1996 |
| JP | 08-124365 | 5/1996 |
| JP | 10-63578 | 3/1998 |
| JP | 11-110915 | 4/1999 |
| JP | 11-120690 | 4/1999 |
| JP | 11-250577 | 9/1999 |
| JP | 2000-067518 | 3/2000 |
| JP | 2001-236730 | 8/2001 |
| JP | 2001-298704 | 10/2001 |
| JP | 2002-051288 | 2/2002 |
| JP | 2003-209781 | 7/2003 |

* cited by examiner

*Primary Examiner*—Jasmine Song
(74) *Attorney, Agent, or Firm*—Dickstein Shapiro LLP

(57) ABSTRACT

A controller 10 carries out a control such as to divide a cache memory 8 for temporarily storing data when recording and/or reproducing the data on a data recordable optical disk 11, into a plurality of memory areas, i.e., a recording data storage memory area and a verifying data storage area, and storing data therein.

36 Claims, 16 Drawing Sheets

INFORMATION RECORDING APPARATUS, INFORMATION RECORDING METHOD AND RECORDING MEDIUM RECORDING PROGRAM

TECHNICAL FIELD

The present invention relates to an information recording apparatus carrying out data recording and/or reproduction on an information recording medium, and in particular, to an information recording apparatus achieving efficient data storage in which a data storage memory is divided according to a mode of data recording, an information recording apparatus carrying out complicate data recording such as data recording in units not larger than recording blocks, data recording carrying out verification processing, or time shift reproduction, an information recording method and a recording medium recording a program.

BACKGROUND ART

In an information recording apparatus carrying out data recording or reproduction on a recording-type disk such as CD-RW disk, DVD+RW disk or such, in many cases, a cache memory temporarily storing data is provided inside of the apparatus so that an increase in processing speed is achieved.

For example, for continuous recording requests from a user, data is temporarily stored in the cache memory inside of the apparatus, recording in the disk is started when the data in the cache reaches a predetermined amount, and, when the data in the cache memory is not left, the recording processing is interrupted, and a waiting is made for when a predetermined amount of data is stored in the cache memory. Such processing is repeated.

Further, during data recording, a vacancy state in the cache memory is monitored, and, when the vacancy occurs, data from a user is received, and thus, an interruption of recording processing is prevented from occurring as much as possible.

Along with a spread of such information recording apparatuses, the processing function is demanded to be improved, and the data recording processing becomes complicated. For example, for the following cases of (1) through (4) below, high-speed processing may not be achieved easily even by a provision of a single cache memory, and a plurality of memories may be required for carrying out efficient data recording:

(1) for a case where data recording is carried out in units not larger than recording blocks;
(2) for a case where data recording is carried out with verification processing;
(3) for a case where a switching is carried out in units not larger than recording blocks; and
(4) for a case of carrying out a time shift reproduction.

For example, when recording processing such as those mentioned above, efficient recording processing may be carried out with a provision of a plurality of cache memories. However, production costs increase accordingly when the cache memories are thus increased.

It is also possible to provide a plurality of cache memories in a pseudo manner by using an existing cache memory in a manner of dividing.

Conventionally, an information recording apparatus exists for dividing a memory into a plurality of division areas and storing data, in which, a segment cache type memory is applied, the number of segments to divide or a particular division memory size is previously set from the entire cache memory capacity or the segment management memory capacity, and, further, management information managing data storage states of the particular division memories is stored in a segment managing memory (see Patent Document 1, for example). Patent Document 1: Japanese Laid-open Patent Application No. 10-63578.

DISCLOSURE OF THE INVENTION

Problem to be Solved by the Invention:

However, in a conventional information recording apparatus, since particular division memories are used in a segment cache manner, complicate memory management is required for each division memory, and, for example, this may not be appropriate for data recording in which continuous recording is carried out for recording block units.

Further, the cache memory should not be divided for data recording not requiring such complicate recording operation. Rather, preferably, all the area may be used for data storage, and thus, a recording interruption occurring from a lack in the recording data from the cache memory may be avoided as much as possible.

The present invention has been devised in consideration of the above-mentioned point, and, an object is to effectively utilize a memory provided for temporarily storing data to record or reproduce on a data recordable information recording medium, and to reduce a data recording interruption as much as possible.

Means for Solving the Problem:

The present invention provides the following information recording apparatus for achieving the above-mentioned object:

an information recording apparatus having temporary storage means for temporarily storing data when recording or reproducing the data on a data recordable information recording medium; and control means for dividing a storage area of the temporary storage means into a plurality of areas according to a mode of data recording in the information recording medium, for storing the data.

The present invention also provides the following information recording method:

an information recording method having a control step of, when recording or reproducing data on a data recordable information recording medium, dividing a storage area of a temporary storage means provided for a temporary storage of the data into a plurality of areas according to a mode of data recording in the information recording medium, for storing the data.

Further, the present invention also provides the following recording medium:

a recording medium recording a program for causing a computer to execute a control procedure of, when recording or reproducing data on a data recordable information recording medium, dividing a storage area of a temporary storage means provided for a temporarily storage of the data into a plurality of areas according to a mode of data recording in the information recording medium, for storing the data.

Advantageous Effect of the Invention:

By the information recording apparatus, information recording method and program, it is possible to effectively utilize a memory provided for temporarily storing data to record or reproduce on a data recordable information recording medium, and to reduce a data recording interruption as much as possible.

Figure 1:
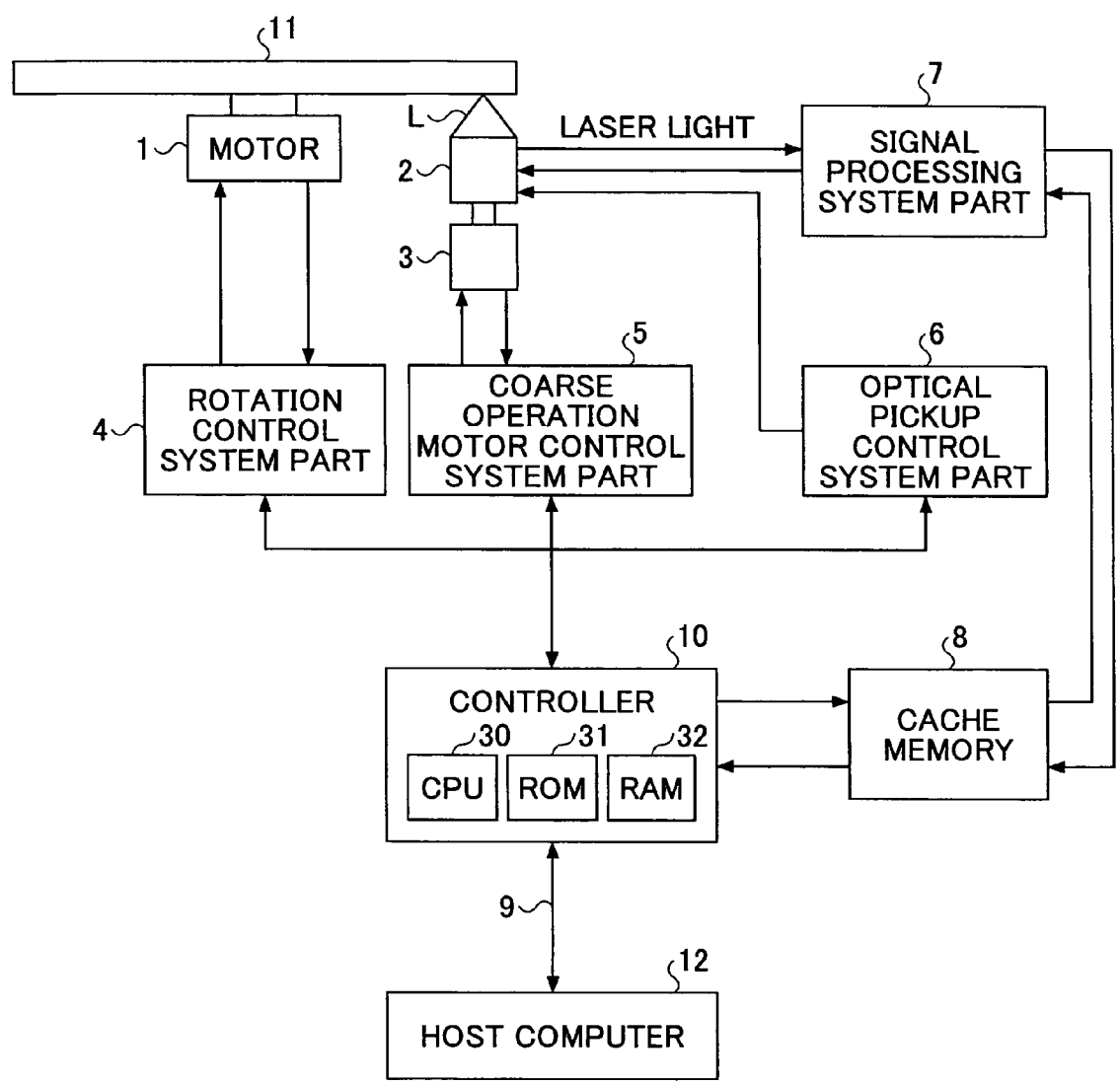
FIG. 1 is a block diagram showing a configuration of an information recording apparatus in one embodiment of the present invention.

DESCRIPTION OF REFERENCE NUMERALS 1 motor
2 optical pickup
3 coarse operation motor
4 rotation control system part
5 coarse operation motor control system part
6 optical pickup control system part
7 signal processing system part
8 cache memory
9 external interface
10 controller
11 optical disk
12 host computer
20 recording data storage memory area
21 fraction data storage memory area
22 verification memory area (switch destination data storage memory)
23 reproduced data storage memory area
30 CPU
31 ROM
32 RAM

BEST MODE FOR CARRYING OUT THE INVENTION

Below, a best mode for carrying out the invention is described specifically based on the figures.

FIG. 1 is a block diagram showing a configuration of an information recording apparatus in one embodiment of the present invention.

This information recording apparatus is an optical disk apparatus such as a DVD drive carrying out recording or reproduction of data (information) on an optical disk such as a data recordable information recording medium such as CD-R disk, CD-RW disk, CD-MRW disk, DVD+R disk, DVD+RW disk, DVD+MRW disk or such.

This information recording apparatus has a host computer 12 connected thereto for receiving instructions of data recording and reproduction, and, based on the instructions, data recording and reproduction on an optical disk 11 which is an information recording medium is carried out.

A motor (spindle motor) 1 rotates the optical disk 11 upon data recording and reproduction when the optical disk 11 is mounted.

An optical pickup 2 can carry out fine operation, and carries out reading and recording of data recorded on a recording surface by applying laser light L generated by a light source such as a laser diode on the optical disk 11. A coarse operation motor 3 is a motor for moving the optical pickup 2 in a radial direction of the optical disk 11. A rotation control system part 4 carries out rotation control of the motor 1. A coarse operation motor control system part 5 carries out rotation control of the coarse operation motor 3.

An optical pickup control system part 6 carries out control of laser light emission of the optical pickup 2 and so forth.

A signal processing system part 7 carries out processing on a signal from the optical pickup 2, and transmission/reception of data for data recording on the optical disk 11 or data reproduced therefrom.

A cache memory 8 is an area (memory area) for temporarily storing data reproduced from the optical disk 11 and data to record in the optical disk 11. That is, it has a function of the above-mentioned temporary storage means.

An external interface 9 carries out data communication with the host computer 12.

A controller 10 is achieved by a microcomputer made of a CPU 30, a ROM 31 a RAM 32 and so forth, carries out control of the entirety of the information recording apparatus, divides the memory area of the cache memory 8 according to a mode of data recording, and carries out data recording, verifying, reproduction and so forth. That is, it stores the above-mentioned each program according to the invention in a recording medium such as the ROM or RAM 32, executes the above-mentioned information recording method according to the present invention by executing the program, and carries out a function of each means including the above-mentioned control means according to the present invention.

Specifically, the control means includes recording means, verifying means, reproducing means, ring buffering manner data storage means, means for holding until the completion of verification processing, means for holding data recorded in a recording area for which verification processing is not completed, means for setting so that a size of verification storage area to be less than a size of the recording data storage area, means for immediately carrying out data reproduction by the reproducing means when a reproduction request is received when the recording means is in a waiting state, means for carrying out data reproduction by the reproducing means after waiting for the completion of recording of continuously recordable data of data stored in the recording data storage area when a reproduction request is received when the recording means is in a waiting state, and means for carrying out data reproduction by the reproducing means after waiting for the completion of recording of continuously recordable data of data stored in the recording data storage area when a reproduction request is received when the recording means is in a waiting state.

This information recording apparatus stores data in a buffering manner optimum to each divided memory area when the cache memory 8 is used after the memory area is divided.

For example, it is preferable to use the division memory areas, from among the plurality of division memory areas, such as a recording data storage area, a reproduced data storage area, or one used for verifying, in a ring buffer manner.

Further, normally, the cache memory 8 for storing recording data or reproduced data is used in the ring buffering manner. An advantage of the ring buffering manner is that, after data is stored in an end address in the memory area of the cache memory 8, data is stored subsequently from a starting address of the memory area.

For example, when data recording is carried out, by referring to a pointer in the cache memory 8 updated when data is received from the host computer 12, a pointer updated when stored data is recorded in the optical disk 11, or such, a data occupation rate in the cache memory 8 can be easily calculated.

Accordingly, from among the plurality of division memory areas, at least those used for data recording storage, reproduced data storage and verifying may be preferably used in the ring buffering manner.

Further, when the cache memory 8 in the information recording apparatus is used in the ring buffering manner, a ring start pointer and a ring end pointer of the memory area used in the ring buffering manner are set, and a ring buffer is produced in the memory area defined by the pointers.

Accordingly, for the following cases of (A) and (B), a plurality of ring start pointers and ring end pointers should be set in the cache memory 8.

(A) a case where the cache memory to use in the ring buffering manner is divided, and, at least one division memory is used in the ring buffering manner (B) a case where a plurality of division memory areas of those thus divided are used in the ring buffering manner In such a case, it is preferable that the ring start pointers and ring end pointes can be set at a plurality of positions simultaneously. However, in a conventional apparatus in which, to divide a cache memory 8 according to a recording made is not considered, many cases the ring start pointers and ring end pointers cannot be set at plurality of positions.

Further, for when, as in the above-mentioned case (A), one ring buffer includes another ring buffer, a problem occurs when the ring start pointers and the ring end pointers are simply set at a plurality of positions.

This is because, as an unexpected ring start pointer or ring end pointer exists in a memory area to use as a ring buffer, data may be stored in an erroneous position.

Next, a case where (2) data recording with verification processing, described above in the background art, is described in detail.

As a format in which, a defect managing function is added to a re-recordable information recording medium (optical disk) such as CD-RW disk, DVD+RW disk or such, a Mt. Rainier standard has been set up.

According to the Mt. Rainier standard, in format processing carried out in prior to data recording, after recording is made on the entire surface of an optical disk by a predetermined data pattern, the recorded data is verified. Thus, a defect is detected from the optical disk.

Further, in the Mt. Rainier standard, a background format is adopted, and, during a time having no access from the host computer, dummy data recording by the format and verifying of the recording area are carried out in the background.

By this background format, a required formatting time before data recording by the host computer is remarkably reduced. However, sine verification processing is also carried out in the background, user data may be recorded before the verification. Accordingly, whether or not data recorded in the optical disk can be properly read, cannot be ensured.

Accordingly, in the Mt. Rainier standard, when data is recorded in an area not verified, verifying of the recording area after the recording should be carried out, and thus, whether the recording was made properly should be determined.

Thus, according to the Mt. Rainier standard, data recording with verification processing is required.

In the verification processing, when a defect is found out from the recording area, data recorded there is again recorded (switched) in a predetermined switch area. Accordingly, at least before the completion of the verification, data in the cache memory should be kept.

That is, at least within a size of the cache memory, data recording should be once interrupted, verification should be carried out, and, after the completion of the verification, data recording should be carried out subsequently. Thus, while data reliability can be ensured, data recording performance may degrade.

Further, in the Mt. Rainier standard, no defect detecting method in verification processing nor criterion has been defined, and, thus, each manufacturer carries out verification in its original method or criterion.

However, the most common defect detecting method is such that reproduction is made from an area in which once data is recorded on an optical disk. Then, the reproduced data is stored in a cache memory and error detection and correction processing is carried out.

Since, as described above, recording data in the cache memory should be kept until the completion of the verification processing, and overwriting of the recording data by the verification reproduced data should be avoided.

That is, a memory for storing the recording data and a cache memory for storing the verification reproduced data are required for data recording with verification.

Therefore, in the information recording/reproduction apparatus, when data recording with data reproduction (verification, time shift reproduction) is carried out, a small-size ring buffer is used for storing the reproduced data.

Further, in the information recording/reproduction apparatus, after the data recording, data in the recording data storage memory area is kept until the completion of verification on all the recording area. However, the verification completion for all the recording area should not necessarily be waited for. Accordingly, from among the memory areas, a memory area, for which proper recording is verified, is released in sequence, in which next data is received and stored.

Further, in the information recording/reproducing apparatus, for data recording not requiring verification processing, a vacant area of the cache memory is used for storing data received from the host computer during recording. Thus, an interruption of data recording is avoided as far as possible, and thus recording processing performance is maintained. However, for data recording requiring verification, data recording is interrupted each time the verification occurs.

Further, until the completion of verification, recording data in the cache memory 8 should be kept, and thus, a data recording interruption should be made within the memory capacity.

That is, the data recording performance becomes lower as the memory capacity of the cache memory 8 is smaller, for data recording requiring verification.

Data reproduction in the verification is carried out for the purpose of determining whether or not data is properly recorded. Accordingly, data itself stored in the cache memory is not required. Accordingly, the data stored in the verification is allowed to be overwritten by data reproduced by subsequent verifying operation.

From these matters, when the cache memory 8 is divided into the recording data storage memory area and the verification memory area, it is preferable to enlarge the capacity of the recording data storage memory area as much as possible while the capacity of the verification memory area should be kept smaller as much as possible.

Next, the above-mentioned case (4) of time shift reproduction in the background art, is described in detail.

As an advanced example using DVD+RW disk, for example, this art may be applied to record a TV program or such in a real-time manner. In real-time data recording, data recording of continuous addresses with a relatively low transfer rate is required. Accordingly, when a recording rate in an optical disk is higher than the data transfer rate, recording is interrupted when data is depleted from the cache memory, and, when data is stored in the cache memory to a predetermined amount, recording is then re-started. Such a process is frequently repeated.

At this time, when data recording is started, an optical pickup should be moved and thus seek operation is carried out for a target address. In this case, when a time required for recording increases due to a recording retry caused by a seek error or such, data to record is not left for the real-time data recording. Accordingly, the memory size of the cache memory may be preferably enlarged, and thus, an interruption during recording should be avoided as much as possible.

An apparatus carrying out so-called time shift reproduction in which arbitrary video is reproduced from a part for which recording is completed is reproduced, in an information recording apparatus carrying out real-time data recording, has been devised.

When time shift reproduction is carried out, data recording and reproduction requests are given alternately, from a user.

When a reproduction request is received during data recording, commonly reproduction processing is carried out after all the data in the memory is recorded in a conventional apparatus. Accordingly, each time a switching occurs between the recording/reproduction requests from the user, the recording is interrupted, and the seeking occurs.

That is, in the time shift reproduction, a recording interruption occurs frequently without regard to the memory size, and a retry time is required due to a seek error or such. Thus, the problem may likely to occur.

In the information recording apparatus, in order to solve the above-mentioned problem, reproduced data is stored in an area other than the recording data storage memory, and, even when recording data exists in the cache memory 8 upon reception of a reproduction request, recording is not started as long as a data occupation ratio in the cache memory 8 does not exceed a predetermined threshold, while data reproduction is carried out. Then, storage of the recording data to a fixed amount is waited for.

Further, when data recording in the optical disk 11 is carried out upon reception of a data reproduction request, the recording should not be interrupted for the reproduction, and, the completion of recording of at least data which can be continuously recorded within a current writing operation is waited for. Then, the reproduction is carried out.

Further, in the information recording apparatus, data required before a reproduction request is received from the host computer 12 may be reproduced without being recorded in the optical disk 11.

That is, when a reproduction request is received for data which is not yet recorded in the optical disk 11, reproduction of data from the optical disk 11 is not carried out, but, data in the cache memory 8 not yet recorded is notified of to the host computer 12.

Further, in order to reduce the number of times of seeking in data recording, and to achieve stable data recording, the recording data storage memory area should be as large as possible.

Figure 2:
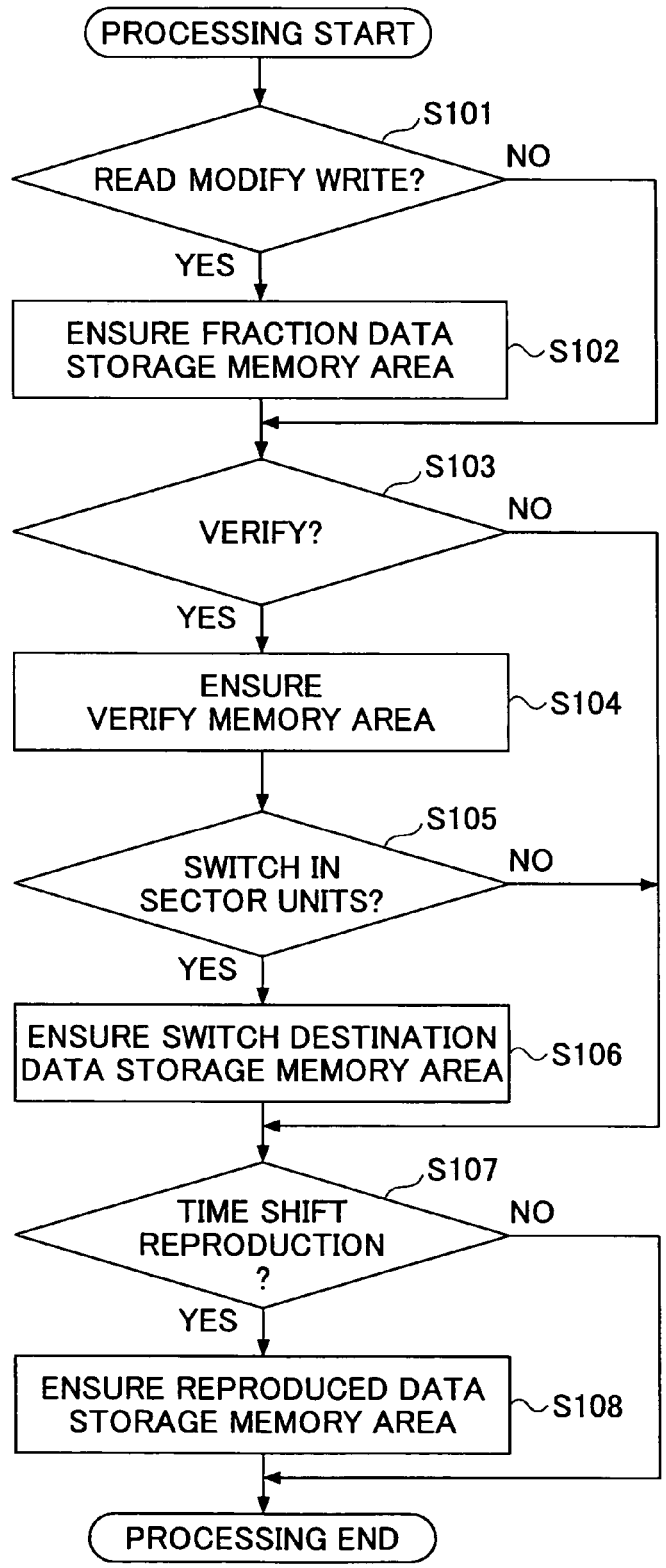
FIG. 2 is a flow chart showing memory dividing processing of a cache memory in the information recording apparatus shown in FIG. 1.

FIG. 2 is a flow chart which shows memory dividing processing of the cache memory in the information recording apparatus shown in FIG. 1.

This memory dividing processing is carried out, for example, at a time of receiving an initial data recording request from the host computer 12, and the divided memory area is returned to the original state when a data recording completion request is received form the host computer 12. Thus, usage of the cache memory 8 according to the data recording mode is made possible.

When starting the memory diving processing, the controller 10 determines whether or not 'read modify write' should be carried out, in Step (indicated by 'S' in the figure) 101.

For example, upon recording in CD-MRW disk, DVD+RW disk or DVD+MRW disk, the host computer 12 is allowed to carry out data recording randomly in sector units. However, writing in the optical disk 11 should be made in packet units or ECC block units, and 'read modify write' may occur.

Accordingly, when determining that read modify write is required in Step 101, the controller 10 ensures a fraction data storage memory area (fraction data storage area) for temporarily storing data smaller than the recording block, obtained from dividing the recording area of the cache memory, in Step 102.

On the other hand, for recording in those other than CD-MRW disk, DVD+RW disk or DVD+MRW disk, read modify write does not occur. Accordingly, when determining that read modify write is not required in Step 101, the controller 10 proceeds on to Step 103 with skipping Step 102.

Next, the controller 10 determines whether or not data recording requires verification processing in Step 103.

For example, for CD-MRW disk or DVD+MRW disk, verification may be carried out on the area after recording the data. Accordingly, when determining that verification is required in Step 103, the controller 10 divides the memory area (storage area) of the cache memory in Step 104, and ensures a verification memory area (verification storage area).

Next, when a defect is found out in the verification, the controller 10 determines whether or not switch in sector units is to be carried out, in Step 105.

For example, verification in CD-MRW disk includes sector unit defect detection, and only a defect sector in the packet is to be switched.

Accordingly, when determining that sector unit switch is carried out in Step 105, the controller 10 divides, in Step 106, the cache memory, and ensures a switch destination data storage memory area (switch destination data storage area).

For DVD+MRW disk, defect detection is carried out in ECC block units, and when a defect occurs, switch is carried out in ECC block units. Accordingly, when determining that sector unit switch is not carried out in Step 105, the controller 10 skips Step 106 and proceeds on to Step 107.

For recording in those other than CD-MRW disk or DVD+ MRW disk for example, data recording with verification does not occur. Accordingly, when determining that data recording does not requires verification in Step 103, the controller 10 skips Steps 104 through 106, and proceeds on to Step 107.

Next, the controller 10 determines whether or not time shift reproduction is carried out, and, when time shift reproduction is carried out, the controller 10 divides the memory area of the cache memory in Step 108, ensures a reproduced data storage memory area (reproduced data storage area), and finishes this processing.

When determining that time shift reproduction is not carried out in Step 107, Step 108 is skipped and the processing is finished.

For the above-mentioned plurality of division memory areas which are not used simultaneously, dividing into a plurality of memory areas is not required, and, one division memory area may be used for a plurality of purposes.

For example, for CD-MRW disk, verification processing and switch destination packet reading are not carried out simultaneously.

Further, data stored in the verification memory area should not be kept during switch destination packet reading. Contrary, data stored in the switch destination storage memory should not be kept during verification.

For such a case, one division memory area may be used for verification and switch destination data storage.

Figure 3:
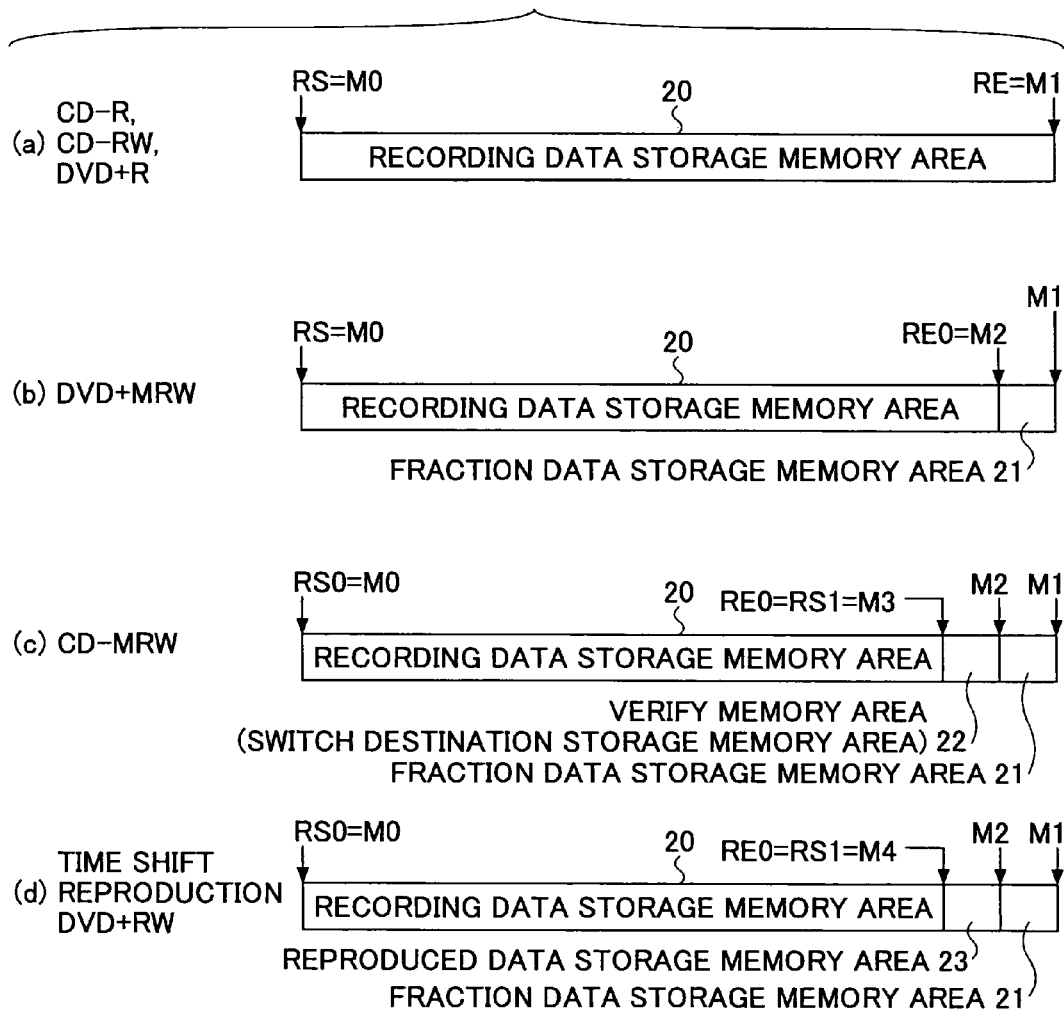
FIG. 3 is a diagram showing a layout of memory areas divided in the above-mentioned manner by a controller 10 shown in FIG. 1.

FIG. 3 shows a layout of memory areas divided in the above-mentioned manner by the controller 10.

FIG. 3, (a) is a layout of the memory area for carrying out data recording on CD-R disk, CD-RW disk or DVD+R disk.

In the recording in the disk, complicate processing such as read modify write is not required, and thus, the entire memory area of the cache memory 8 may be used as the recording data storage memory area (recording data storage area) 20.

That is, the controller 10 sets a start address M0 of the memory area to be a ring start pointer (RS), and sets an end address M1 of the memory area to be a ring end pointer (RE).

FIG. 3, (b) shows an example of memory area dividing for recording data in DVD+RW disk.

Random recording may be made on DVD+RW disk by a user in sector units, and read modify write should be made. Accordingly, the controller 10 divides the cache memory 8 into the data recording storage memory area 20 and the fraction data storage memory area (fraction data transfer memory area) 21. That is, the address M0 through M2 of the cache memory 8 is used as the recording data storage memory area 20, while, the address M2 through M1 is used as the fraction data storage memory area 21.

Further, the controller 10 uses the recording data storage memory area 20, from among these division memory areas, in a ring buffering manner, and, a start address M0 and an end address M1 of the recording data storage memory area 20 are set to be the ring start pointer (RS0) and ring end pointer (RE0), respectively.

FIG. 3, (c) is memory area dividing example for recording data in CD-MRW disk or DVD+MRW disk.

The optical disk may be randomly recorded by the host computer 21 in sector units the same as for DVD+RW disk, and read modify write is required. Accordingly, the controller 10 divides the cache memory 8 into the recording data storage memory area 20 and the fraction data storage memory area 21.

Further, the optical disk requires verification processing in data recording, and thus, the controller 10 further divides the recording data storage memory area 20 to ensure a verification memory area (verification storage area) 22.

Read modify write occurs also in switch processing for CD-MRW disk. Accordingly, a switch data storage memory area is required. However, the switch data storage memory area should not be newly ensured, as a result of the switch packet data being stored in the verification memory area 22.

Thus, upon data recording in CD-MRW disk or DVD+ MRW disk, the controller 10 uses the address M0 through M3 of the cache memory 8 as the recording data storage memory area 20, the addresses M3 through M2 as the verification memory area (switch destination data storage memory area) 22 and the addresses M2 through M1 as the fraction data storage memory area 21. From among these division memory areas, the recording data storage memory area 20 and the verification memory area 22 are used in the ring buffering manner, so that memory managing can be made easier.

That is, upon recording processing, the controller 10 sets the start address M0 and end address M3 of the recording data storage memory area 20 to be the ring start pointer (RS0)A and ring end pointer (RE0), respectively. Upon verification processing, the controller 10 sets the start address M3 and end address M2 of the verification memory area 22 to be the ring start pointer (RS1) and ring end pointer (RE1), respectively.

FIG. 3, (d) shows memory area dividing example when carrying out time shift reproduction from recording in DVD+ RW disk.

Normally, when time shift reproduction is required for TV program recording, commonly sequential data recording is required. However, for DVD+RW disk, the host computer 12 is allowed to randomly record data. Accordingly, for example, random recording may be required for when recorded data management information is recorded.

Accordingly, the controller 10 ensures the fraction data storage memory area 21 by dividing the recording data storage memory area 20.

Next, in order to store reproduced data in response to a reproduction request from the host computer 12 during data recording, the controller 10 ensures a reproduced data storage memory area (reproduced data storage area) 23 by further dividing the recording data storage memory area 20.

Thus, upon time shift reproduction on DVD+RW disk, the controller 10 uses the address M0 through M4 of the cache memory 8 as the recording data storage memory area 20, the addresses M4 through M2 as the reproduced data storage memory area 23 and the addresses M2 through M1 as the fraction data storage memory area 21. From among these division memory areas, the recording data storage memory area 20 and the reproduced data storage memory area 23 are used in the ring buffering manner, so that memory managing can be made easier.

That is, upon recording processing, the controller 10 sets the start address M0 and end address M4 of the recording data storage memory area 20 to be the ring start pointer (RS0)A and ring end pointer (RE0), respectively. Upon data reproduction, the control 10 sets the start address M4 and end address M2 of the reproduced data storage memory area 23 to be the ring start pointer (RS1) and ring end pointer (RE1), respectively.

Figure 4:
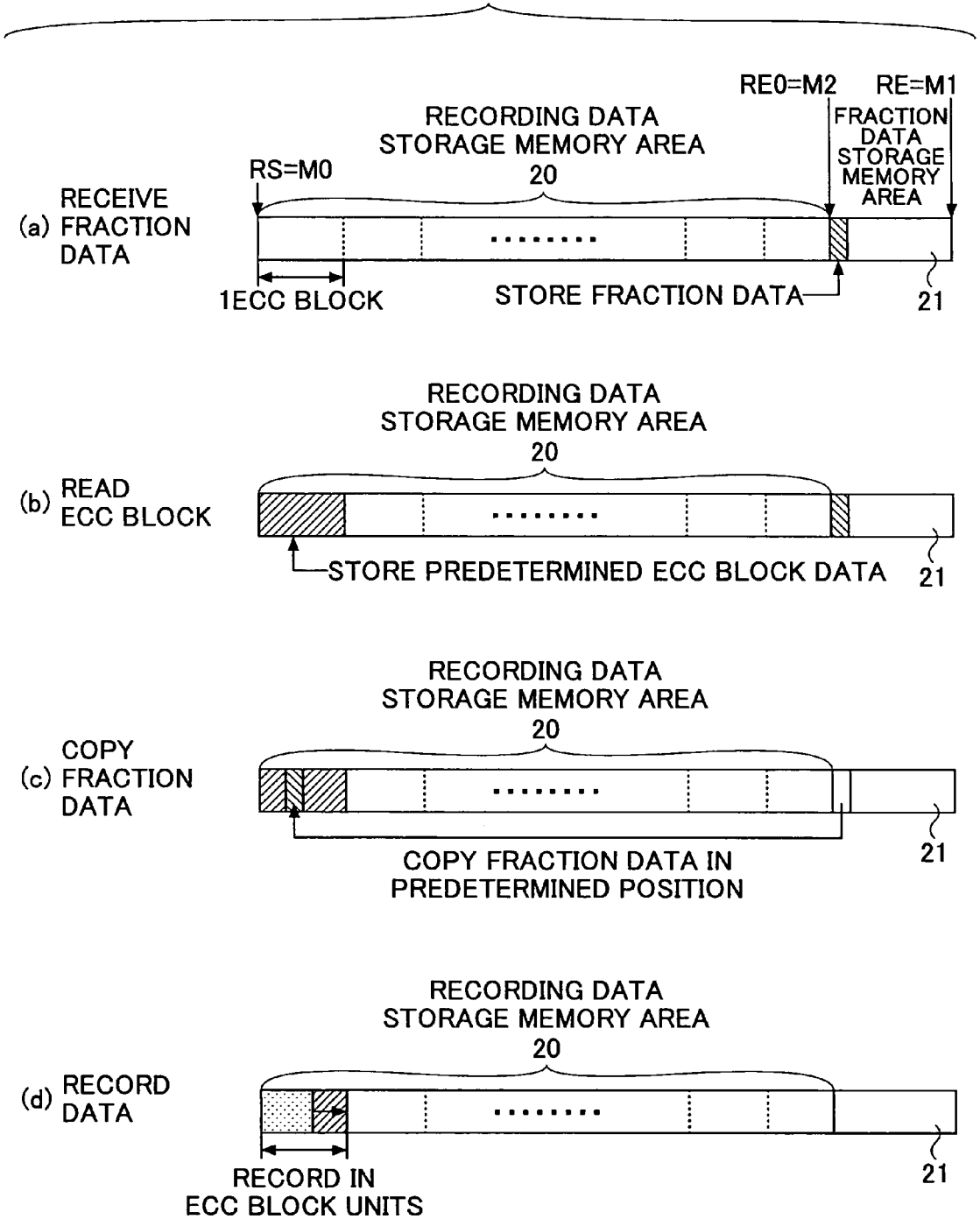
FIG. 4 illustrates an example of memory division and data recording for when data recording is carried out in units smaller than recording block units by the controller 10 shown in FIG. 1.
Figure 5:
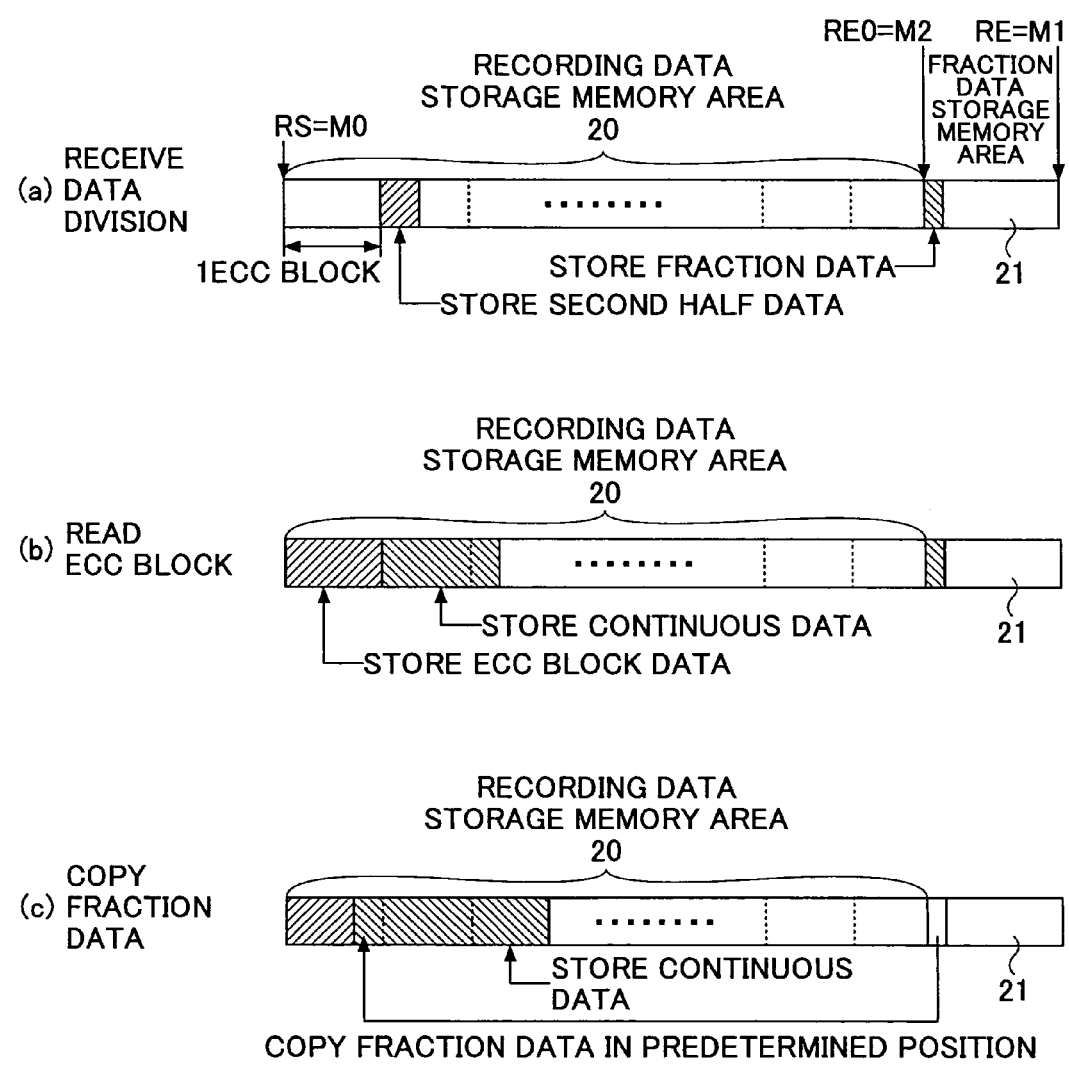
FIG. 5 also illustrates an example of memory division and data recording for when data recording is carried out in units smaller than recording block units by the controller 10 shown in FIG. 1.
Figure 6:
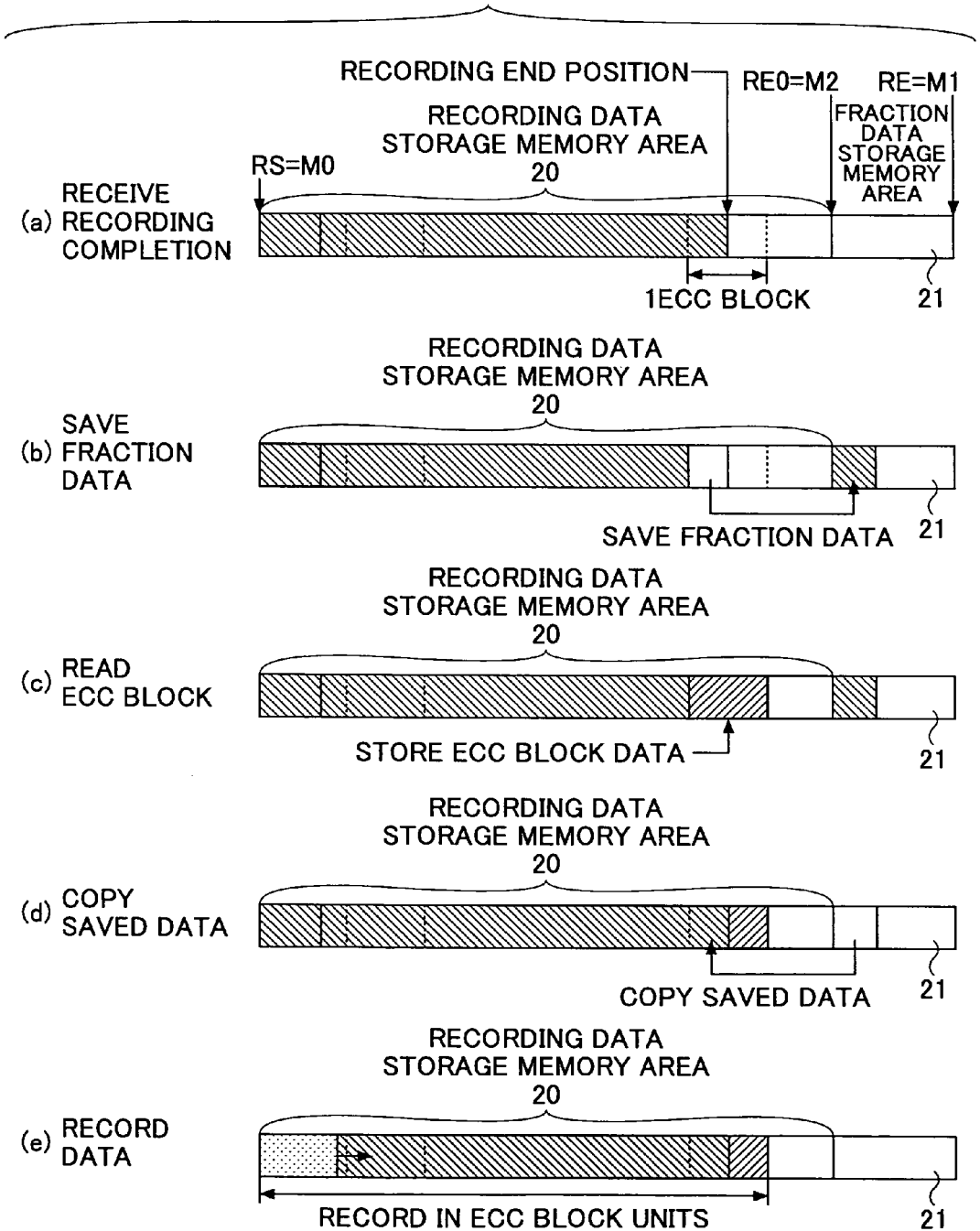
FIG. 6 also illustrates an example of memory division and data recording for when data recording is carried out in units smaller than recording block units by the controller 10 shown in FIG. 1.

FIGS. 4 through 6 illustrates memory dividing and data storage for recording data smaller than the recording block unit by the controller 10.

As shown in FIG. 3, (b), the controller divides all the memory area (memory areas M0 through M1) of the cache memory into the recording data storage memory area (memory addresses M0 through M2) 20 and the fraction data storage memory area (memory addresses M2 through M1) 21. Below, description is made for an example of recording in DVD+RW disk.

FIG. 4, (a) through (d) illustrates a usage example of the cache memory 8 when the host computer 12 requests data recording in sector units.

When receiving a recording request for an address other than an ECC block boundary from the host computer 12, the controller 10 temporarily stores requested data in the fraction data storage memory area 21 (see FIG. 4, (a)). At this time, the controller 10 reports a completion notification for the recording request to the host computer 12.

Next, the controller 10 reads an ECC block including the requested recording address from the optical disk 11, and stores the same in the recording data storage memory area 20 (see FIG. 4, (b)).

Next, the controller 10 copies the fraction data, temporarily saved in the fraction data storage memory area 21, in a predetermined position of the above-mentioned read ECC block data (see FIG. 4, (c)), and writes back the same in the ECC block unit in the optical disk 11 (see FIG. 4, (d)).

Thus, by ensuring the memory area for storing the fraction data, reception of the requested recording data is allowed before the predetermined ECC block is read from the optical disk 11.

Further, by reporting the recording completion notification to the host computer 12 after the requested data storage, data recording performance can be improved.

FIG. 5, (a) through (c) and FIG. 6, (a) through (e) is the cache memory usage example when the host computer 12 carries out data recording continuously.

In this example, it is assumed that a writing start address and a writing end address are not on ECC block boundaries.

When the host computer 12 makes a recording request such as to go through an ECC block boundary, the controller 10 first stores temporarily data from the recording start address through the ECC block boundary in the fraction data storage memory area 21, and the remaining data in the recording data storage memory area 20.

At this time, the controller 10 stores the first half of the requested data from the start position (memory address M2) of the fraction data storage memory area 21, and the second half from a position spaced by one ECC block from the start positron (memory address M0) of the recording data storage memory area 20 (see FIG. 5, (a)).

After storing the data mentioned above, the controller 10 reports the completion notification for the recording request to the host computer 12.

Next, the controller 10 reads the ECC block including the data temporarily stored in the fraction data storage memory area 21 from the optical disk 11, and stores the same at the starting position (memory address M0) of the recording data storage memory area 20.

When receiving a sequential recording request from the host computer during this period, the controller 10 continuously stores in the recording data storage memory area 20 without regard to whether or not the address is on an ECC block boundary (see FIG. 5, (b)).

Next, when the reading of the ECC block is finished, the controller 10 copies the requested recording data temporarily stored in the fraction data storage memory area 21, in a predetermined position of the read ECC block data (see FIG. 6, (c)).

When receiving a recording finish request from the host computer 12 at a time when the requested recording data end address is not on an ECC block boundary (see FIG. 6, (a)), the controller 10 temporarily saves the requested data which is fraction data of ECC block in the fraction data storage memory area 21 (see FIG. 6, (b)), reads the ECC block including this fraction data from the optical disk 11, and stores the same in a predetermined position of the recording data storage memory area 20 (see FIG. 5, (c)).

Next, the controller 10 again copies the data saved in the fraction data storage memory area 21, then in a predetermined position of the recording data storage memory area 20 (see FIG. 6, (d)), and then writes back in the optical disk 11 in ECC block units.

It is noted that, the controller 10 starts recording when the data occupation ratio in the recording data storage memory area 20 exceeds a predetermined threshold before receiving the recording finish request from the host computer 12.

When receiving a recording completion notification from the user after the recording start, the recording is once interrupted at an address on the ECC block boundary, then the predetermined ECC block including the written fraction data is read, and recording of the ECC block is carried out.

Figure 7:
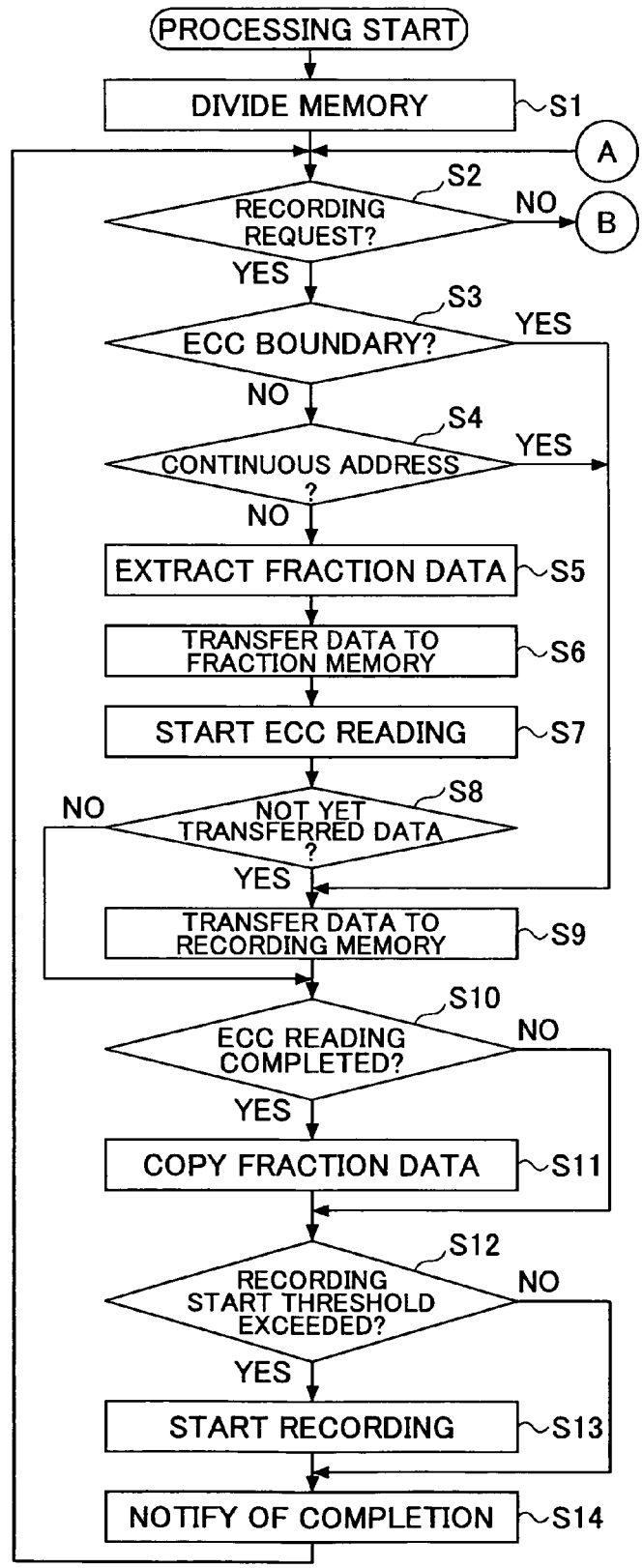
FIG. 7 is a flow chart showing data recording operation on DVD+RW disk by the controller 10 shown in FIG. 1.
Figure 8:
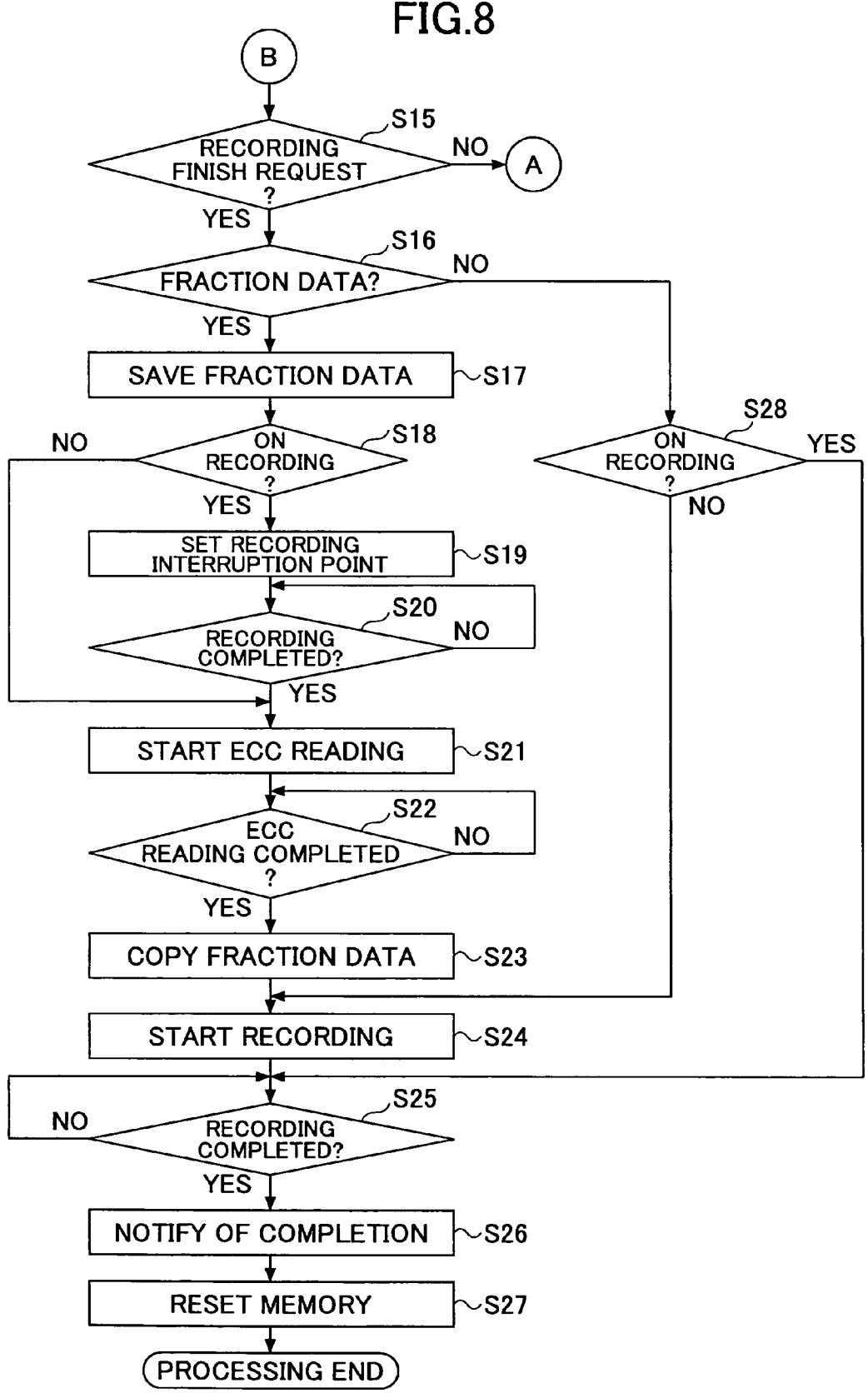
FIG. 8 is a flow chart showing processing subsequent to FIG. 7.

FIGS. 7 and 8 is a flow chart showing data recording operation in DVD+RW disk by the controller 10.

Upon starting data recording, the controller 10 carries out memory dividing on the cache memory in Step (indicated by 'S' in the figure) 1.

In this memory dividing, in the processing shown based on FIG. 2, the controller 10 carries out memory dividing of the cache memory 8, and as a result, divides the storage area of the cache memory 8, as shown in FIG. 3, (b), into the recording data storage memory area 20 and the fraction data storage memory area 21.

In Step 2, the controller 10 determines whether or not a recording request comes from the host computer 12. At this time, since recording is requested, it is determined that the host computer makes the recording request, and, in Step 3, it is determined whether or not it is on an ECC boundary (whether or not the requested recording address is on an ECC block boundary). When it is on an ECC boundary (when the requested recording address is on an ECC block boundary), Step 9 is proceeded on, requested data is received, is transferred in a recording memory (recording data storage memory area), and is stored there. However, it is assumed that the requested recording address is not on an ECC block boundary. In this case, when the determination in Step 3 is 'not on an ECC boundary (the requested recording address is not on an ECC block boundary)', the controller 10 determines in Step 4 whether or not it is a continuous address (whether or not the current requested recording address is continuous from the immediately preceding requested recording address).

When it is a continuous address (when the recording request is continuous from the immediately preceding recording request) in the determination of Step 4, the controller 10 proceeds on to Step 9, receives data, transfers it to a predetermined position of the recording memory (recording data storage memory area) and stores there. Upon data recording beginning, no immediately preceding recording request exists. Accordingly, when the determination in Step 4 is that it is not continuous address, the controller 10 extracts fraction data up to the ECC block boundary from among the requested recording data in Step 5, transfers it to a fraction memory (fraction data storage memory area) in Step 6, and stores there (see FIG. 4, (a)). After storing the fraction data in the fraction data storage memory area, processing of reading ECC block data including the fraction data from the optical disk in ECC reading is started in Step 7.

Next, in Step 8, the controller 10 determines whether or not not-transferred data exists, which is not yet received from among the host computer requesting recording data. When no not-transferred data exists, Step 10 is proceeded on, and it is determined whether or not ECC reading has been completed. There, it is assumed that the not-transferred data exists. In Step 8, when the not-transferred data exists, the controller 10 transfers the data to the recording memory (recording data storage memory area) and stores there.

In this case, the data storage is carried out to one ECC block subsequent from the recording data storage memory area's starting address (see FIG. 5, (a)). This is because, data read from the optical disk 11 should be stored from the top of the recording data storage memory area.

Next, in Step 10, the controller 10 determines whether or not ECC block reading is completed. There, since it is immediately after the ECC block reading start, when the determination in Step 10 is thus not the ECC reading completion, the controller 10 skips Step 11 and proceeds on to Step 12.

Next, Step 12, the controller 10 determines whether or not the data occupation amount in the recording storage memory area exceeds the predetermined recording start threshold.

Upon recording start, since the data occupation amount does not exceed the recording start threshold, when the determination in Step 12 is thus that the recording start threshold is not exceeded, the controller 10 skips Step 13 and proceeds on to Step 14.

Next, the controller 10 notifies the host computer of the completion for the data recording request in Step 14, returns to Step 2 and waits for a data recording request from the host computer again.

The description has been thus made for processing for the data recording request upon recording beginning.

Thus, in the information recording apparatus, by diving the cache memory 8 into the recording data storage memory area and the fraction data storage memory area, the requested recording data can be received before the completion of reading of the ECC block including the fraction data. Accordingly, performance for the recording request can be improved.

Further, the controller then waits for a recording request from the host computer 12.

At this time, when a continuous data recording request is received from the host computer, without regard to whether or not the recording address is an ECC block boundary, that is, even when it is determined that it does not correspond to an ECC boundary in Step 3, the controller 10 determines that it corresponds to a continuous address, transfers the data to the recording data storage memory area in Step 9, and stores there (see FIG. 5, (b)).

When the determination in Step 10 is that ECC block reading is completed during data reception, the controller 11 proceeds on Step 11, and copies the fraction data, received in the fraction data storage memory area in Step 6, then in a predetermined position of the read ECC block (see FIG. 5, (c)).

Further, when, in Step 12, during data reception, the data occupation amount in the recording data storage memory area exceeds the predetermined recording start threshold, the controller 10 starts data recording.

On the other hand, when, in Step 2, it is determined that no data recording request comes from the host computer, the condoler 10 proceeds on Step 15, and determines whether or not the data recording finish request comes from the host computer. When no data recording finish request comes, Step 2 of FIG. 7 is returned to, it is determined again whether or not a data recording request comes from the host computer, and the data recording request is waited for.

When receiving a data recording request from the host computer, the controller proceeds on to Step 16 to determine whether or not the data end address corresponds to an ECC block boundary, that is, whether or not fraction data exists at the end of data writing. When it is determined in Step 16 that no fraction data occurs, the controller 10 determines in Step 28 whether or not it is during data recording. During data recording, Step 25 is proceeded on. Not during data recording, Step 24 is proceeded on.

Here, it is assumed that fraction data exists at the end of data writing (see FIG. 6, (a)).

In this case, in Step 16, the controller 10 thus determines that fraction data occurs, and, in Step 17, saves the data in the fraction data storage memory area (see FIG. 6, (b)).

Next, in Step 18, the controller 10 determines whether or not it is during recording in the optical disk. During data recording, a recording interruption point is set such as to interrupt data recording at an ECC block boundary, other than the above-described fraction data. Then in Step 20, it is determined whether or not data recording is completed, and data recording completion is waited for.

On the other hand, not during data recording in the determination in Step 18, the controller 10 skips Steps 19 and 10, and proceeds on to Step 21.

Next, in Step 21, reading of the ECC block including the fraction data is started, it is determined in Step 22 whether or not reading is completed, and ECC reading completion is waited for (see FIG. 6, (c)).

When ECC block reading is completed in the determination of Step 22, the controller 10 copies in Step 23 the fraction data saved in the fraction data storage memory area in Step 17, then in a predetermined position of the read ECC block (see FIG. 6, (d)), and, in Step 24, recording in the optical disk 11 in ECC block units is started (see FIG. 6, (e)). In Step 25, it is determined whether or not data recording is completed, and data recording completion is waited for.

When data recording is completed in the determination of Step 25, the controller 10 notifies of the completion for the data recording request to the host computer in Step 26, restores the memory area divided in Step 1 (returns to the original state) in Step 27, and the current processing is finished.

Figure 9:
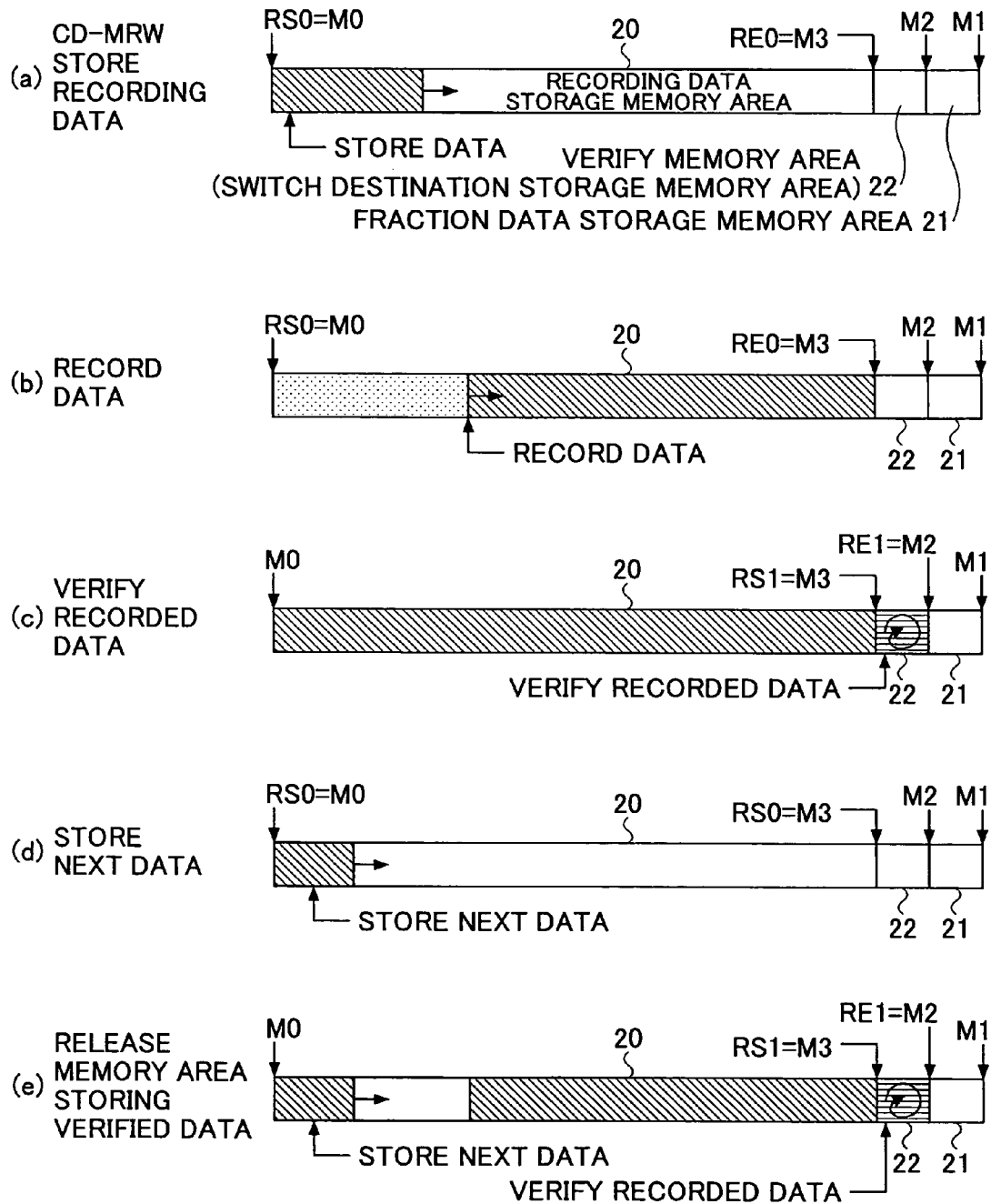
FIG. 9 illustrates an example of memory division and data storage for when data recording is carried out with verification processing and switching processing by the controller 10 shown in FIG. 1.
Figure 10:
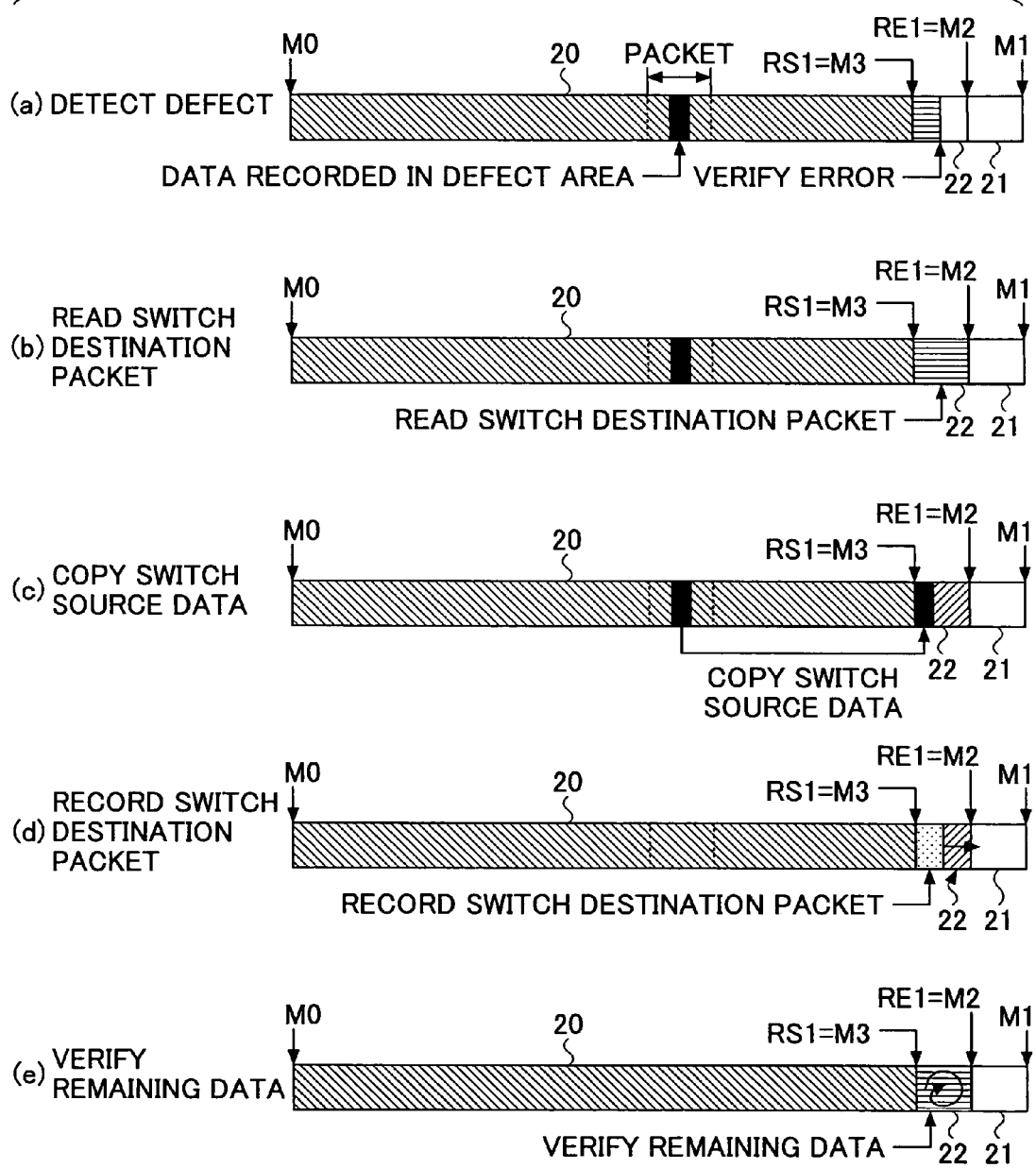
FIG. 10 illustrates an example of memory division and data storage for when data recording is carried out with verification processing and switching processing by the controller 10 shown in FIG. 1.

FIGS. 9 and 10 illustrate an example of memory dividing and data storage upon carrying out data recording accompanied by verification processing and switch processing by the controller 10.

Here, a case where, in an example of recording in CD-MRW disk, switch is carried out in sector units is described.

It is noted that, since the user is allowed to randomly record in sector units for CD-MRW disk, the fraction data storage memory area is ensured. However, for the purpose of simplification of description, it is assumed that recording is carried out continuously in packet units.

FIG. 9, (a) through (e) shows a format of memory dividing and data storage upon data recording accompanied by verification.

The controller 10 divides the entire memory area (memory addresses M0 through M1) of the cache memory 8 into the recording data storage memory area (memory addresses M0 through M3) 20, the verification memory area (memory addresses M3 through M2) 22 and the fraction data storage memory area (memory addresses M2 through M1) 21.

When receiving a packet-unit continuous data recording request from the host computer 12, the controller 10 stores the data in the recording data storage memory area 20 (see FIG. 9, (a)). Further, when the data occupation amount in the recording data storage memory area 20 becomes not less than a predetermined recording start threshold (in this example, the size of the recording data storage memory area), the controller 10 records the recording data in the optical disk (see FIG. 9, (b)).

It is noted that, from the data reception through the data recording, the controller 10 uses the recording data storage memory area 20, that is, the memory addresses M0 through M3 in a ring buffering manner, and sets the ring start point (RS0) and the ring end pointer (RE0) as the memory addresses M0 and M3, respectively. When recording of the data stored in the recording data storage memory area 20 is completed, the controller 10 carries out verification of the recording area.

The same as in the reproduction processing, the controller carries out the verification processing in such a manner as to store the reproduced data in the verification memory area 22, carries out error detection/error correction, and makes a determination as to whether or not the recording is made properly (defect detecting).

At this time, the controller 10 uses the verification memory area 22, that is, the area of the memory addresses M3 through M2, in a ring buffering manner, and sets the ring start point (RS1) and the ring end pointer (RE2) as the memory addresses M3 and M2, respectively. As long as no defect is detected, the data stored in the verification memory area 22 is overwritten by the subsequent area's verification data (see FIG. 9, (c)).

When completing the verification of all the data recorded and determining that recording is made properly, the data held in the recording data storage memory area 20 becomes unnecessary. Accordingly, the recording data storage memory area 20 is released, the subsequent data is received from the host computer 12, and is stored there (see FIG. 9, (d)).

It is noted that the data for which a determination is made that recording is made properly should not be held in the recording data storage memory area 20. Accordingly, the recording data storage memory area 20 may be released in sequence from the data verified, and then, recording data from the host computer 12 may be stored (see FIG. 9, (e)).

FIG. 10, (a) through (e) shows a format of a memory usage example for switch processing.

Since switch in sector units is carried out for CD-MRW disk, read modify write should be made even in switch operation.

However, since it is not necessary to hold data stored for verification even during switch or data stored upon switch even during verification, it is possible to use the verification memory area 22 also as the switch destination data storage memory area.

That is, the controller 10 uses the memory addresses M3 through M2 of the cache memory 8 as the switch destination data storage memory area 22.

When one sector of the storage area is determined to have a defect in the verification (see FIG. 10, (a)), the data recorded in this defect area should be again recorded in a predetermined switch area.

The controller 10 first reads the predetermined switch destination packet data and stores the same in the switch destination data storage memory area 22 (see FIG. 10, (b)).

Next, the data recorded in the defect area is copied to the predetermined position of the switch destination packet (see FIG. 10, (c)), and recording in the packet unit in the switch destination packet is carried out (see FIG. 10, (d)).

Then, when completing the switch processing, the controller 10 re-starts verification of the remaining recording data (see FIG. 10, (e)).

It is noted that, for DVD+MRW disk, switch is carried out in ECC block units. Accordingly, the switch destination ECC block data should not be read out.

Accordingly, data in the recording data storage memory area 20 may be directly recorded in the switch destination ECC block.

Figure 11:
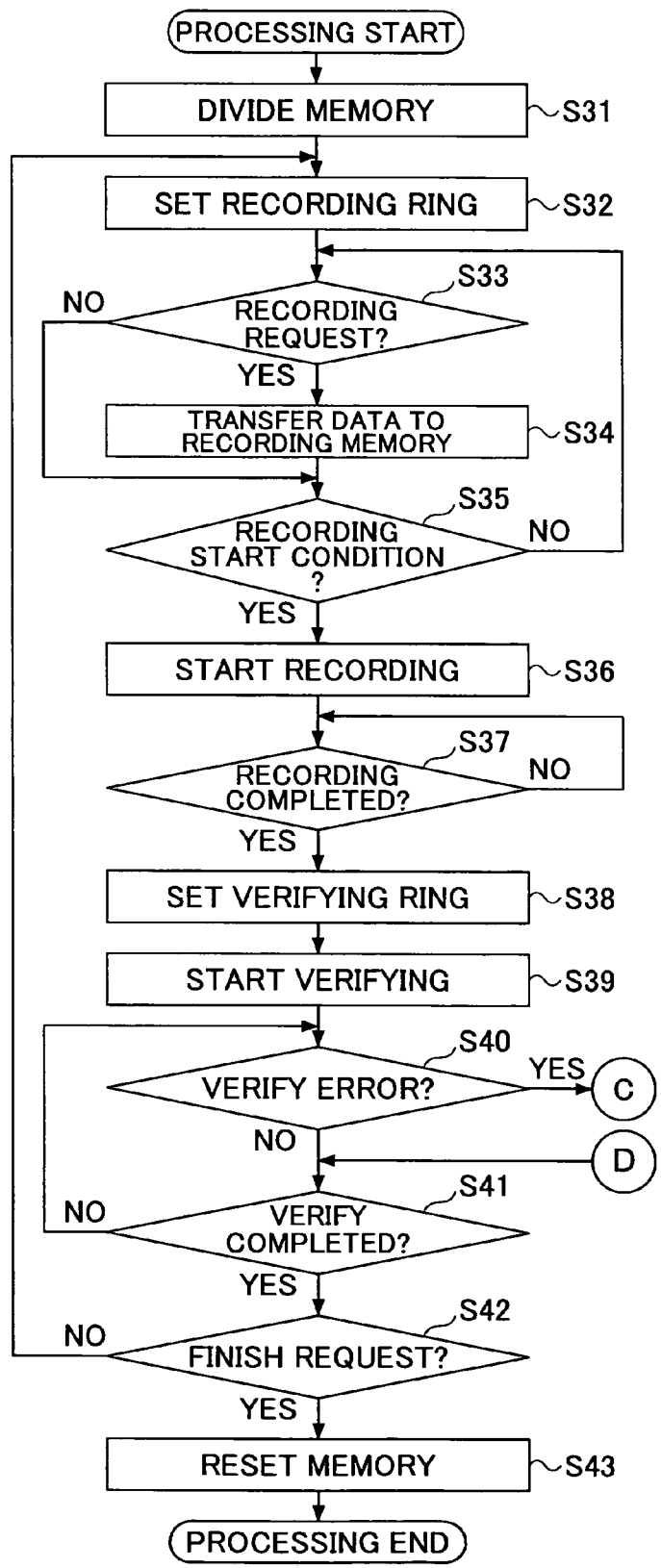
FIG. 11 is a flow chart showing data recording operation on CD-MRW disk by the controller 10 shown in FIG. 1.
Figure 12:
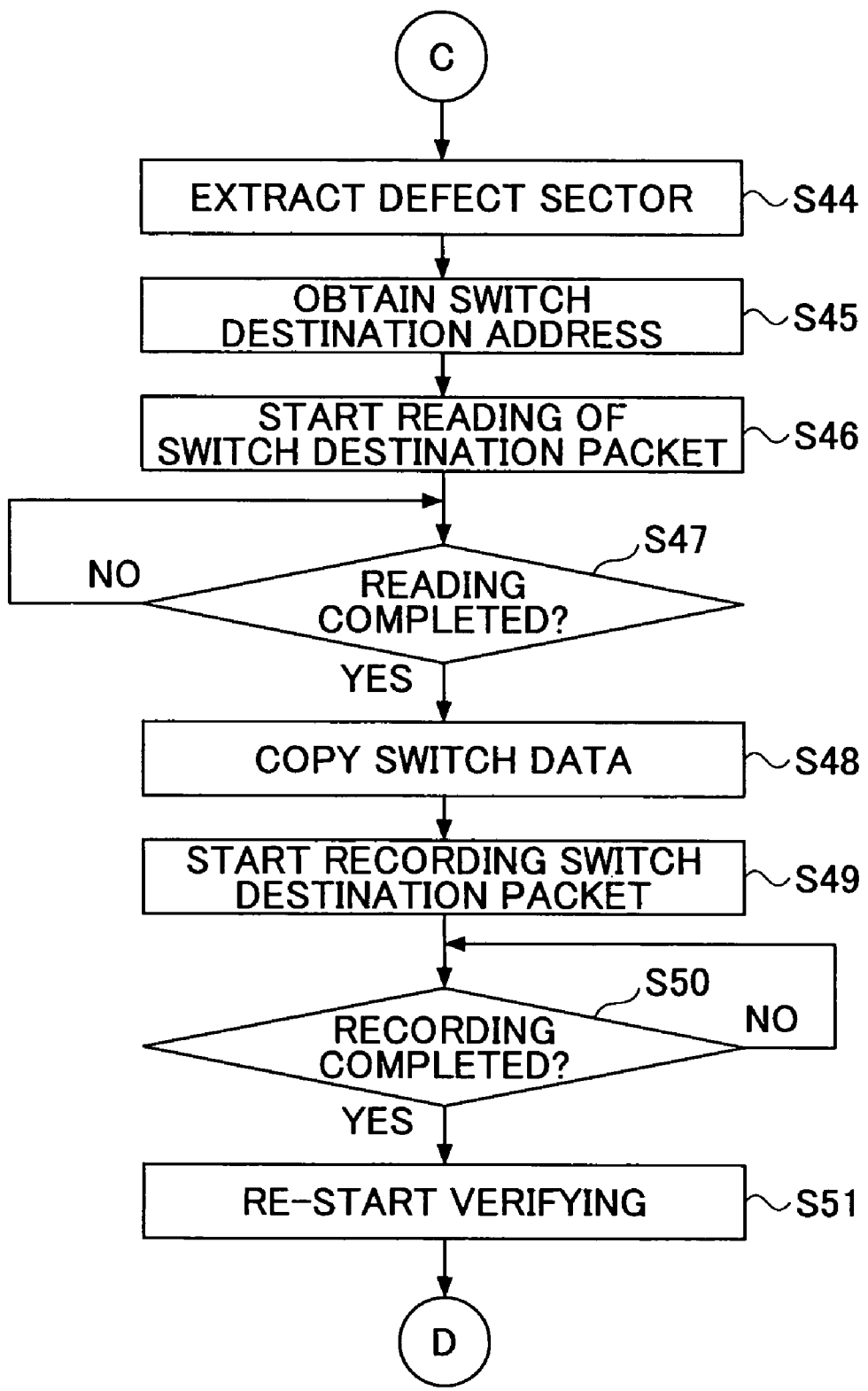
FIG. 12 is a flow chart subsequent to FIG. 11.

FIGS. 11 and 12 is a flow chart showing data recording in CD-MRW disk by the controller 10.

It is noted that, for CD-MRW disk, random recording in sector units is allowed by the host computer 12. However, for the sake of simplification of description, it is assumed that continuous recording in packet units is carried out here.

As shown in FIG. 11, the controller 10 carries out memory dividing on the cache memory in Step (indicated by 'S' in the figure) upon beginning of the data recording processing.

In this memory dividing processing, the controller carries out memory dividing of the cache memory 8 in the processing shown based on FIG. 2, and as a result, it divides the storage area of the cache memory 8, as shown in FIG. 3, (c), into the recording data storage memory area 20, the verification memory area (switch destination packet storage memory area) 22 and the fraction data storage memory area 21.

In the present embodiment, next, in order to use the recording data storage memory area 20 in a ring buffering manner, the controller 10 sets the memory addresses M0 and M3 as a ring start pointer (RS0) and a ring end pointer (RE0) respectively in Step 32, and determines whether or not a data recording request comes from the host computer in Step 33.

Since recording is requested there, the controller 10 determines that the data recording request exists in Step 33, receives the requested data, transfers the same in the recording memory (recording data storage memory area), and stores there, in Step 34 (see FIG. 9, (a)).

Next, in Step 35, it is determined as to whether or not a condition for starting the recording is met.

As this condition, whether or not the data occupation amount in the recording data storage memory area exceeds a predetermined recording start threshold, whether a data recording completion request is given by the host computer, or such, may be considered.

When the recording start condition is not met in the determination of Step 35, the controller 10 returns to Step 33, again determines whether or not a data recording request comes from the host computer, and waits for the data recording request.

On the other hand, when the recording start condition is met in the determination of Step 35, the controller 10 starts recording of the data stored in the recording data storage memory area then in the optical disk in Step 36, determines in Step 37 whether or not the recording is completed, and waits for the completion of the recording (see FIG. 9, (b)).

When the recording is completed in the determination of Step 37, the controller 10 proceeds on to verification processing.

Here, first, the controller 10 sets, in verification ring setting processing, for the purpose of using the verification memory area in a ring buffering manner in Step 38, the memory addresses M3 and M2 as a ring start pointer (RS1) and a ring end pointer (RE1), respectively.

Next, in Step 39, the controller 10 starts verification of the recording area, determines in Step 40 whether or not verification error occurs, and, when verification error occurs, the controller 10 proceeds on to Step 44 of FIG. 12. When no verification error occurs, the controller 10 proceeds on to Step 41 to determine whether or not the verification is completed. When the verification is not completed, Step 40 is returned to. When the verification is completed, Step 42 is proceeded on.

That is, in Steps 40 and 41, the controller 10 carries out defect detection from the recording area, and waits for the verification completion.

It is noted that, as long as no defect is found out, the data stored in the verification memory area 22 is overwritten by the next area verification data by the controller 10 (see FIG. 9, (c)).

When the verification is completed in the determination of Step 41, and it is confirmed that data is properly recorded, the controller 10 determines in Step 42 whether or not a recording finish request is given by the host computer, and, when no recording finish request is given, Step 32 is returned to. Then, the ring start pointer and the ring end pointer are set again, and data from the host computer is received (see FIG. 4, (d)).

On the other hand, when the recording finish request is given in the determination of Step 42, the controller 10 restores the memory area (returns to the original state), once divided in Step 31, and finishes the current processing.

When a defect is found out from the recording area in the determination of Step 40, the controller 10 proceeds on to switch processing. Here, first, the sector determined as defect in Step 44 of FIG. 12 is extracted (see FIG. 10, (a)).

Next, the controller 10 obtains a switch destination address of an area usable for the switch from among predetermined switching areas in Step 45, reads in Step 46 the switch destination packet data including the switch destination area, and stores the same in the switch destination data storage memory area (see FIG. 10, (b) In Step 47, the controller 10 determines whether or not the reading is completed, and repeats reading and storage in the switch destination data storage memory area until the reading completion.

When the switch destination packet reading is completed in the determination of Step 45, the controller 10 copies the data recorded in the defect area in a predetermined position of the switch destination data storage memory area in Step 48 (see FIG. 10, (c)), starts data recording in the packet unit to the switch destination packet in Step 49, determines in Step 50 whether or not the data recording is completed, and waits for the completion if the completion does not occur yet (see FIG. 10, (d)).

When the above-mentioned switch processing is completed and the data recording completion is determined in Step 50, the controller 10 re-starts verification of the recording area in Step 51, and returns to Step 41 to proceed with the defect detection processing.

It is noted that, when it is determined as to whether or not the data recorded in the switch destination packet is properly recorded, verification may be made with the use of the verification memory area.

Figure 13:
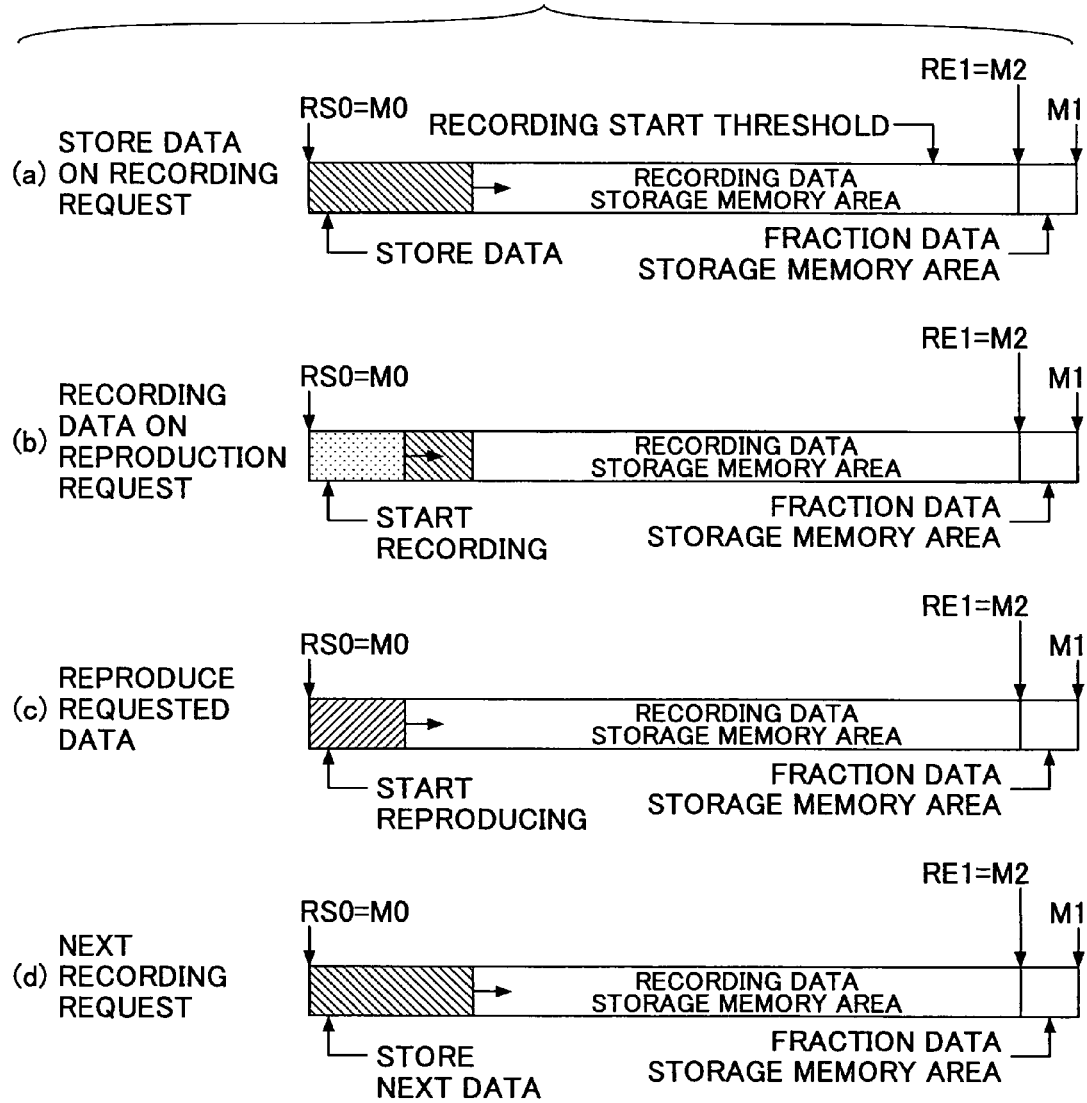
FIG. 13 illustrates an example of memory division and data storage for when a time shift reproduction is carried out on DVD+RW disk in a conventional apparatus.
Figure 14:
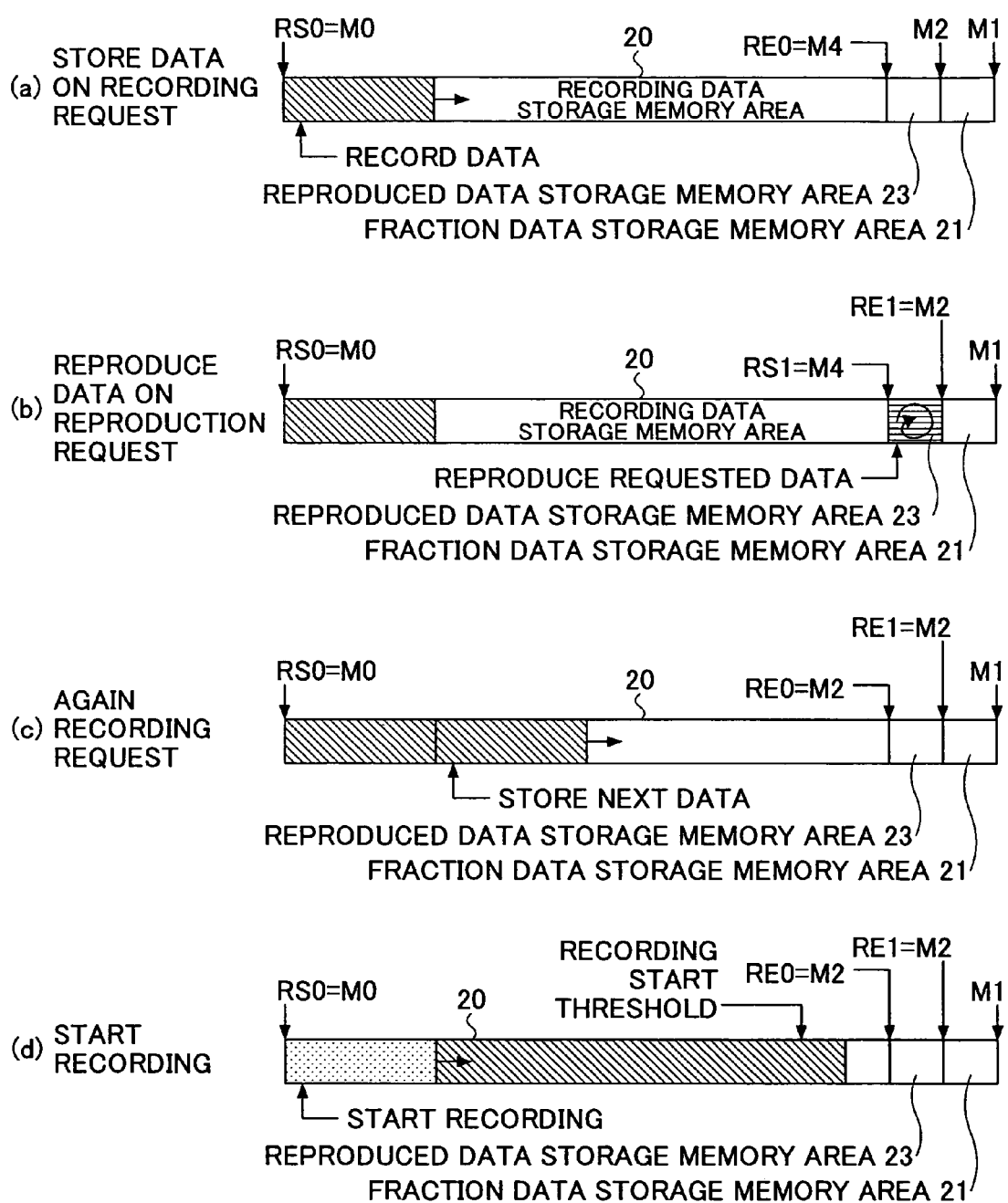
FIG. 14 illustrates an example of memory division and data storage for when a time shift reproduction is carried out on DVD+RW disk by the controller 10 shown in FIG. 1.

FIGS. 13 and 14 illustrate memory dividing and data storage when time shift reproduction is carried out in DVD+RW disk.

FIG. 13, (a) through (d) shows a data storage format upon time shift reproduction in a conventional apparatus having no reproduced data storage memory area.

First, when a data recording request is received from the host computer, the controller 10 stores the data in the recording data storage memory area, and notifies the host computer of the processing completion (see FIG. 13, (a)). Since the data occupation amount in the recording data storage memory area does not exceed a predetermined recording start threshold in this stage, the controller 10 does not start recording in the optical disk.

Next, when a data reproduction request is received from the host computer, in order to complete the recording processing, the controller 10 records the data stored in the recording data storage memory area in the optical disk (see FIG. 13, (b)), after that reproduces the requested data, and stores in the recording data storage memory area (see FIG. 13, (c)).

Upon time shift reproduction, recording and reproduction are alternately requested by the host computer. When a recording request is again received, the controller 10 stores the data in the recording data storage memory area, and notifies the host computer of the processing completion (see FIG. 13, (d)).

Thus, in the time shift reproduction in the conventional apparatus, the recording processing is interrupted each time recording and reproduction requests from the host computer are switched, and seek operation occurs accordingly.

That is, upon time shift reproduction, without regard to the memory size, an interruption occurs frequently, and a time is required for retry processing caused due to a seek error or such.

FIG. 14, (a) through (d) shows a data storage format upon the time shift reproduction by the controller 10.

Here, the controller 10 divides, as shown in FIG. 3, (b), the entire memory area (memory addresses M0 through M1) of the cache memory 8, into the recording data storage memory area (memory addresses M1 through M4) 20, and the reproduced data storage memory area (memory addresses M4 through M1) 23.

It is noted that, for DVD+RW disk, the host computer is allowed to randomly record in sector units, and thus, the fraction data storage memory area 21 is ensured. However, for the purpose of simplification of description, it is assumed here that, continuous recording in ECC block units is made.

When receiving a data recording request from the host computer 12, the controller 10 stores the data in the data storage memory area 20, and notifies the host computer 12 of the processing completion (see FIG. 14, (a)). At this stage, the data occupation amount in the recording data storage memory area 20 does not exceed the predetermined recording start threshed, and thus, the controller 10 does not start recording in the optical disk.

It is noted that, the controller 10 uses the recording data storage memory area 20, i.e., the memory addresses M0 through M4 in a ring buffering manner, and sets the memory addresses M0 and M4 as a ring start pointer (RS0) and a ring end pointer (RE0) respectively, from the data reception through the data recording.

Next, when receiving a data reproduction request from the host computer 12, the controller 10 reads the requested data from the optical disk and stores in the reproduced data storage memory area 23 (see FIG. 14, (b)), in prior to data recording.

At this time, the controller 10 sets the memory addresses M4 and M2 as a ring start pointer (RS1) and a ring end pointer (RE1) respectively to use the reproduced data storage memory area 23 in a ring buffering manner.

Next, when receiving a recording request continuous from the preceding recording data from the host computer 12, the controller 10 again sets the data recording ring pointers, and stores the data in the recording data storage memory area 20 continuously (see FIG. 14, (c)).

Thus, when receiving the continuous recording and reproduction requests alternately from the host computer 12, the controller 10 repeats data storage in the data recording storage memory area 20 and data reproduction from the optical disk.

Further, when the data occupation amount in the data recording storage memory area 20 exceeds the predetermined recording start threshold, the controller 10 starts recording (see FIG. 14, (d)).

Thus, by storing the recording data and the reproduced data in the recording data storage memory area and the reproduced data storage memory area respectively, it is not necessary to finish recording of the data from the memory each time of the reproduction request.

Accordingly, the controller 10 can start the recording after the predetermined amount of recording data is stored, upon time shift reproduction, and thus, stable data recording can be made.

Figure 15:
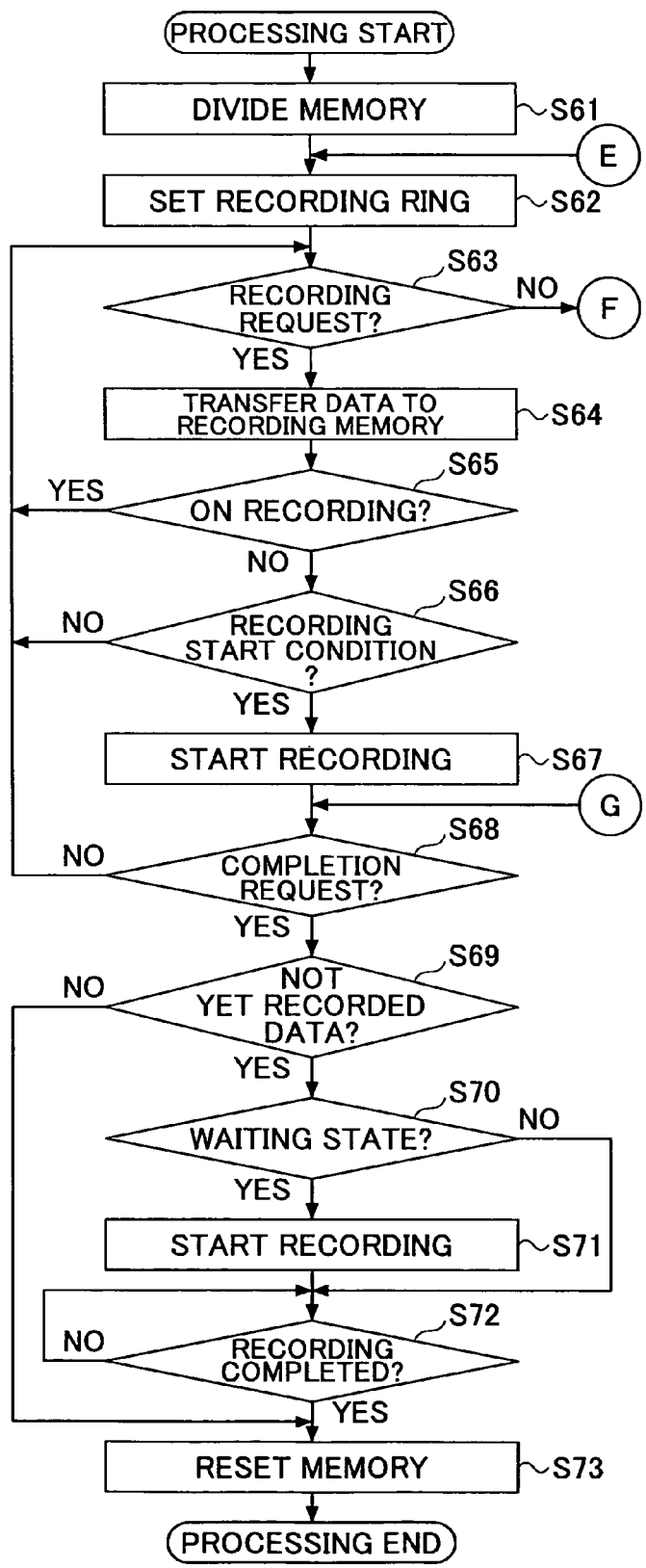
FIG. 15 is a flow chart showing a time shift reproducing operation by the controller 10 shown in FIG. 1.
Figure 16:
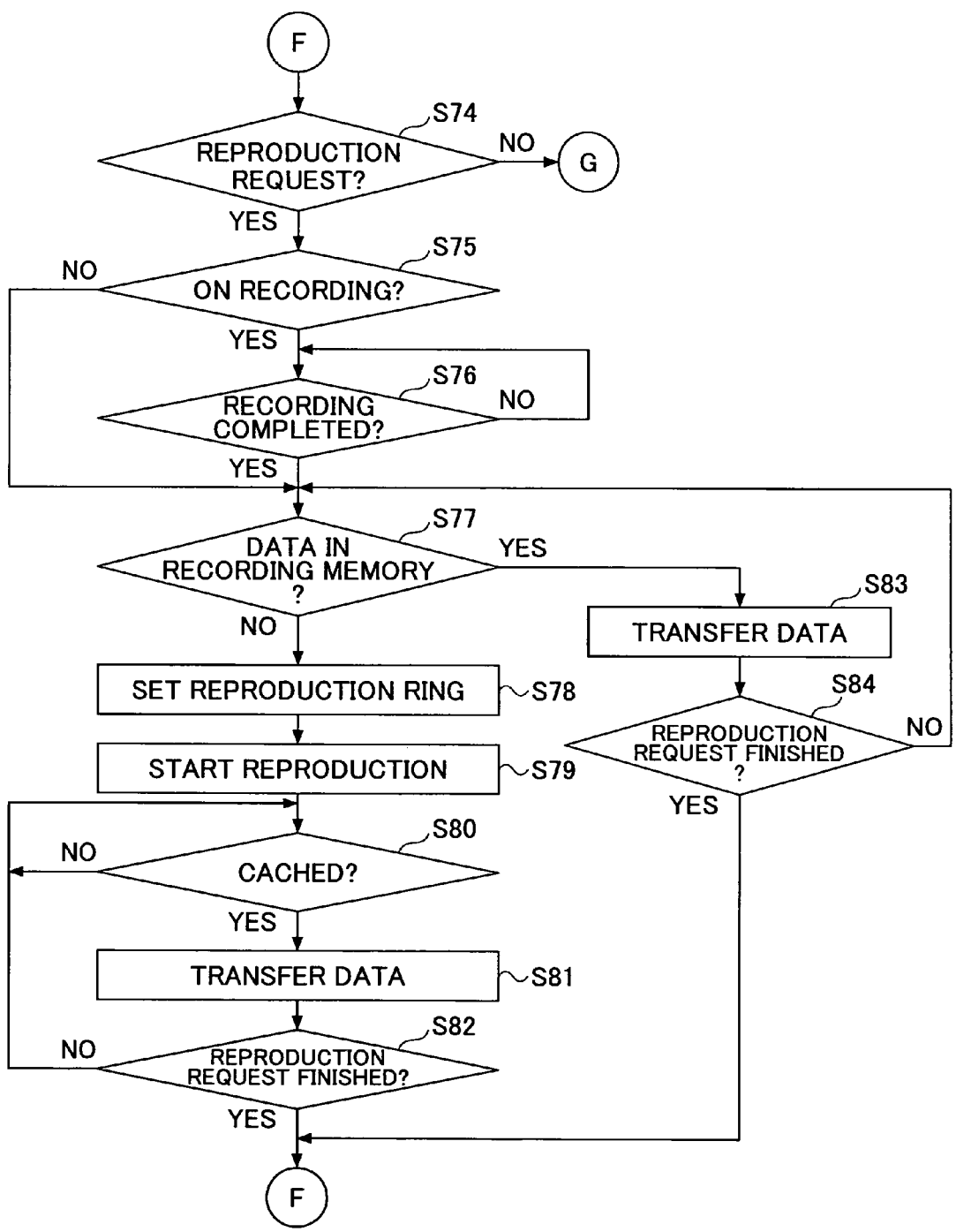
FIG. 16 is a flow chart subsequent to FIG. 15.

FIG. 15 and FIG. 16 show a flow char of time shift reproduction operation by the controller 10.

In the embodiment, DVD+RW disk is handled. In DVD+RW disk, random recording in sector units by the host computer 12 is allowed. However, for the purpose of simplification of description, it is assumed here that continuous recording in ECC block units is made and reproducing is made during recording.

As shown in FIG. 15, the controller 10 carries out memory diving processing on the cache memory in Step (indicated by 'S' in the figure) 61 upon starting the data recording processing.

In this memory dividing processing, the controller carries out memory dividing of the cache memory 8 in the processing shown based on FIG. 2, and as a result, it divides the storage area of the cache memory 8, as shown in FIG. 3, (c), into the recording data storage memory area 20, the reproduced data storage memory area 23 and the fraction data storage memory area 21.

In the present embodiment, next, in order to use the recording data storage memory area 20 in a ring buffering manner, the controller 10 sets the memory addresses M0 and M4 as a ring start pointer (RS0) and a ring end pointer (RE0) respectively in Step 62, and determines whether or not a data recording request comes from the host computer in Step 63.

Since recording is requested there, the controller 10 determines that the data recording request exists in Step 63, receives the requested data, transfers the same in the recording memory (recording data storage memory area), and stores there, in Step 64 (see FIG. 14, (a)).

Next, the controller determines in Step 65 whether or not currently recording is made in the optical disk. Upon the data recording, Step 63 is retuned to, and again it is determined whether or not a data recording request is given by the host computer. Since it is before the recording start, the controller 10 determines in Step 65 that no data recording is being carried out, and, in Step 66, determines whether or not a condition for a subsequent recording start condition is met.

As this condition, whether or not the data occupation amount in the recording data storage memory area exceeds a predetermined recording start threshold, whether or not a data recording completion request is given by the host computer, or such, may be considered.

When the recording start condition is not met in the determination of Step 66, the controller 10 returns to Step 63, again determines whether or not a data recording request comes from the host computer, and waits for the data recording request.

On the other hand, when no data recording request is given by the host computer in the determination of Step 63, the controller 10 proceeds on to Step 74 of FIG. 16, to determine whether or not a reproduction request is given. When a reproduction request is given, the controller determines in Step 75 whether or not currently, recording is being made in the optical disk. Upon the recording, the controller 10 determines in Step 76 whether or not the data recording is completed, and waits for the data recording completion. When determining the data recording completion occurs in Step 76, the controller 10 proceeds on to reproduction processing.

On the other hand, when it is determined in Step 75 that no data recording is being currently made (waiting state before the recording in the optical disk), the controller 10 proceeds on to reproduction processing in prior to the data recording even when data before writing is left in the recording data storage memory area 20.

First, the controller 10 determines in Step 77 whether or not the requested reproduction address data is included in the recording memory (recording data storage memory area). When it is not included in the recording data storage memory area, the controller 10 sets the memory addresses M4 and M2 as a ring start pointer (RS1) and a ring end pointer (RE1) respectively in reproduction ring setting processing of Step 78 (see FIG. 14, (b)) for the purpose of using the reproduced data storage memory area in a ring buffering manner.

Next, the controller 10 determines in Step 80 whether or not the requested data is cached, and waits for the requested data being stored in the reproduced data storage memory area. When the storage is made, the controller 10 transfers the data requested by the host computer 12 in Step 81, and stores the same.

After the transfer of the data requested by the host computer, the data in the reproduced data storage memory area becomes not necessary. Accordingly, the controller 10 overwrites it with data, read in a read-ahead manner.

Next, the controller 10 determines in Step 82 whether or not the data reproduction request from the host computer is finished. When the data reproduction request is not finished, the controller 80 returns to Step 80, to wait for a determination that caching is made (wait for when the requested data is read in the read-ahead manner in the reproduced data storage memory area), and, in Step 81, the controller 10 transfers the data and stores the same.

On the other hand, when the data reproduction request from the host computer is finished in the determination of Step 82, the controller 10 returns to Step 62, to again set the recording ring setting, and waits for a data recording request in the determination of Step 63.

In the information recording apparatus, there is a case where data required before a reproduction request is received from the host computer 12 is reproduced without being recorded in the optical disk.

That is, when a reproduction request is received for data before being recorded in the optical disk, the controller 10 does not reproduce data from the optical disk but should notify the host computer 12 of the data, not yet recorded, from the cache memory 8, That is, when determining in Step 77 that data requested by the host computer 10 exists in the recording data storage memory area, the controller 10 transfers in Step 83 the data from the memory to the host computer, and determines in Step 84 whether or not the reproduction request is then finished. When the data reproduction request is given, the controller 10 returns to Step 77 to determine whether or not the data requested by the host computer exits in the recording data storage memory area.

When the reproduction request is not finished in the determination of Step 84, the controller 10 returns to Step 77. When the reproduction request is finished, the controller 10 returns to Step 62 of FIG. 15.

When the reproduction request is finished in the determination of Step 82, the controller returns to Step 62 of FIG. 15, again carries out the recording ring setting, and waits for a recording request in the determination of Step 63.

Next, processing when again a recording request is received after the reproduction processing requested by the host computer is made, is described.

As shown in FIG. 15, the controller 10 sets the memory addresses M0 and M4 as a ring start pointer (RS0) and a ring end pointer (RE0) respectively for using the recording data storage memory area in a ring buffering manner in Step 62 after the data reproduction processing completion, and determines in Step 63 whether or not a data recording request is given by the host computer.

In Step 63, when a recording request continuous from the immediately preceding recording request address is given by the host computer, the controller 10 stores the data in the recording data storage memory area continuously in Step 64 (see FIG. 14, (c)), determines in Step 65 whether or not it is during data recording, and determines in Step 66 whether or not the recording start condition is met.

When the recording start condition is not met in the determination of Step 66, the controller 10 returns to Step 63 to determine whether or not a recording request is given by the host computer.

Thus, when the host computer 12 makes continuous recording and reproduction requests alternately, the controller 10 repeats data storage in the recording data storage memory area 20 and data reproduction from the optical disk.

That is, as the controller 10 stores the recording data and the reproduced data in the recording data storage memory area and the reproduced data storage memory area respectively, it becomes not necessary to finish recording of the data existing in the memory each time of the reproduction request.

Accordingly, the controller 10 can start data recording after the fixed amount of recording data is stored, upon time shift reproduction, and thus, carry out stable data recording.

On the other hand, when the recording start condition is met in the determination of Step 66, for example, when the data occupation amount in the recording data storage memory area exceeds the predetermined recording start threshold, the controller 10 starts recording in the optical disk in Step 67.

Next, the controller 10 determines in Step 68 whether or not a completion request (recording finish request) is given by the host computer. When the completion request is not given, the controller 10 returns to Step 63, and determines again whether or not a recording request is given by the host computer.

On the other hand, when the completion request (data recording finish request) is given by the host computer in the determination of Step 68, the controller 10 proceeds on to data recording finish processing.

Here, first, the controller 10 determines in Step 69 whether or not not-recorded (not written) data remains in the recording data storage memory area. When not written data is left, the controller 10 determines in Step 70 whether or not it is a waiting state before the recording start. When it is the waiting state, the controller 10 starts data recording in Step 71, determines in Step 72 whether or not the data recording completion occurs, and waits for the data recording completion.

Upon the data recording completion in the determination of Step 72, the controller 10 restores the memory area (returns into the original state), divided in Step 61, in Step 73, and finishes the current processing.

When no data recording request is given in the determination of Step 63, the controller 10 determines in Step 68 whether or not the completion request (data recording finish request) is given in Step 68 when no reproduction request is given in the determination of Step 74. When the completion request is given, the controller 10 proceeds on to the above-described recording finish processing.

In the above-described flow charts, the processing shown in FIGS. 2, 7, 8, 11, 12, 15 and 16 corresponds to a control step. Steps 1, 31 and 61 of FIG. 7 correspond to a step of storing data in a predetermined buffering manner in each area.

Steps 9, 21, 34, 39, 64 and 79 correspond to a step of setting a ring start pointer and a ring end pointer for at least one of respective areas and storing data in a ring buffering manner. Steps 39 through 41 and 51 correspond to a verifying step.

Steps 40 and 41 correspond to a step of holding data recorded in a recording data storage area until verification processing in the verifying step is completed, and a step of holding at least data recorded in the recording area for which verification processing is not completed from among the data stored in the recording data storage area.

Step 38 corresponds to a step of setting a size of the verification storage area to be smaller than the size of the recording data storage area. Steps 62 through 73 correspond to a recording step. Step 79 corresponds to a reproducing step. Step 83 corresponds to a step of reproducing data immediately when a reproduction request is given in a waiting state in the recording step.

Steps 75 and 76 correspond to a step of reproducing data after waiting for continuously recordable data's recording completion from among data stored in the recording data storage area, when receiving a reproduction request in a recording state of the recording step. Step 83 corresponds to a step of transferring data from the recording data storage area when receiving a reproduction request from recording area where the data is to be recorded from the recording data storage area during a waiting state in the recording step. Step 78 corresponds to a step of setting a size of the reproduced data storage area to be smaller than the size of the recording data storage area.

In this information recording apparatus, by using the cache memory in a dividing manner according to a data recording mode, it is possible to, in a pseudo manner, generate cache memories required according to each recording. Thus, even when complicate recording processing is required, efficient data recording can be achieved.

Further, in recording processing not requiring a plurality of cache memories, all the area of the cache memory can be used for recording data storage. Thus, recording interruption occurring when recording data is not left in the cache memory can be avoided as much as possible.

Further, optimum buffering manners may be selected for a plurality of division memory areas in the cache memory. Thus, efficient usage of the division memory areas is made possible.

Further, from among the plurality of division memory areas, a ring buffering manner may be applied at least for the division memory areas applied as the recording data storage memory area, the reproduced data storage memory area, or the verification memory area. Thus, efficient buffering is made possible.

Further, a ring start pointer and a ring end pointer are set for the memory area used in the ring buffering manner, when the memory area is used. Thereby, even in a conventional apparatus in which a plurality of positions of a ring start pointer and a ring end pointer cannot be set simultaneously, the cache memory can be divided into a plurality of areas, and each division memory area can be used in the ring buffering manner.

Further, even when a setting is made such that one ring buffer includes another ring buffer, as a ring start pointer and a ring end pointer are set when each ring buffer is used, it is possible to avoid a situation in which, as unexpected ring start pointer and ring end pointer are left in a memory area, data is stored in an erroneous position.

Further, by storing recording data and reproduced data in verification in a recording data storage area (recording data storage memory area) and a verification storage area (verification memory area), respectively, the recording data in the cache memory can be held even during verification processing. Accordingly, when a defect is found out during verification, the recording data recorded in the defect area can be again recorded in predetermined switch area.

Further, next data is received and stored in sequence in a memory area having stored data for which it is determined that proper recording is made by verification. Accordingly, the recording data can be efficiently stored. Further, at least data stored in an area for which verification is not competed is held. Accordingly, when a defect is found out during verification, the data recorded in the defect area can be again recorded in a predetermined switch area.

Further, by setting the size of the verification storage area to have a minimum necessary capacity, so as to ensure the capacity of the recording data storage area, recording interruption due to verification can be reduced as much as possible, and data recording performance can be improved. Further, in verification processing, the reproduced data itself is not especially important. Accordingly, for example, it is possible to use the verification storage area as a ring buffer and allow it overwritten by reproduced data in sequence so as to easily achieve the verification.

Further, by storing the recording data and the reproduced data in the recording data storage area and the reproduced data storage area (reproduced data storage memory area), respectively, it is not necessary to finish recording of the data existing in the cache memory each time of reproduction request. Accordingly, upon time shift reproduction, data recording can be started after a fixed amount of recording data is stored. Thus, stable data recording can be carried out.

Further, when recording in an optical disk is in process upon a data reproduction request, recording of at least continuously recordable data, from among the recording data stored in the cache memory, for which currently writing is in process, is finished before the reproduction processing. Accordingly, the data occupation amount in the cache memory can be reduced without increasing the time of recording interruption, and preparation can be made for subsequent recording data storage.

Further, when a reproduction request is given for data which has not been recorded in the optical disk, the data before being recorded existing the cache memory is notified of to the host computer. Accordingly, it is possible to properly respond to the reproduction request from the host computer.

Further, by reducing the capacity of the reproduced data storage area to be a minimum necessary so as to ensure the recording data storage area capacity, it is possible to reduce the number of seeking times of recording processing, and to carry out stable data recording.

INDUSTRIAL APPLICABILITY

An information recording apparatus, an information recording method, and a program can be applied in a personal computer such as a desk top personal computer, a notebook personal computer, or such.

The invention claimed is:

1. An information recording apparatus comprising: temporary storage means temporarily storing data in a data recordable information recording medium on the occasion of recording and/or reproduction; and control means dividing a storage area of said temporary storage means to a plurality of areas according to a mode of recording the data in said information recording medium, wherein:

recording means for recording data in the recording area of said information recording medium and reproducing means for reproducing data recorded in the recording area of the information recording medium are provided;

said control means divides the storage area of said temporary storage means into at least a recording data storage area storing data to record in the information recording medium and a reproduced data storage area storing data reproduced from the information recording medium; storing the data to record in the information recording medium in said recording data storage area; and, when a reproduction request is received during recording by said recording means, said reproducing means is made to store data reproduced from the information recording medium in said reproduced data storage area; and said recording means keeps a waiting state of waiting before starting data recording until a data occupation amount in said recording data storage area reaches a predetermined threshold, enters a recording state starting the data recording when the data occupation amount exceeds the predetermined threshold, and records data in the recording area of the information recording medium; and means for immediately causing the reproducing means to reproduce data when a reproduction request is received during the waiting state is provided.

2. The information recording apparatus as claimed in claim 1, wherein: said control means comprises means for storing data in a respective predetermined buffering manner in each area.

3. The information recording apparatus as claimed in claim 1, wherein: said control means comprises means for storing data in at least one of the respective areas in a ring buffering manner.

4. The information recording apparatus as claimed in claim 1, wherein: said temporary storage means comprises means for storing data in a ring buffering manner in which a ring start pointer and a ring end pointer can be set, and said control means comprises means for storing data in the ring buffering manner in at least one of the respective areas with setting the ring start pointer and the ring end pointer.

5. The information recording apparatus as claimed in claim 1, wherein:

recording means for recording data in the recording area of the information recording medium and verifying means for carrying out verification processing of reproduced data from the recording area after being recorded by said recording means and detecting a defect are provided;

said control means divides the storage area of the temporary storage means into at least a recording data storage area storing data to record in said information recording medium and a verification storage area storing data reproduced by said verifying means; data to record in the information recording medium is stored in said recording data storage area; and the recorded data reproduced by the verifying means is stored in said verification storage area.

6. The information recording apparatus as claimed in claim 5, wherein: said control means comprises means for holding the data stored in the recording data storage area until verification processing by said verifying means is completed.

7. The information recording apparatus as claimed in claim 5, wherein: said control means comprises means for holding at least data of the data stored in the recording data storage area from among the data stored in said recording data storage area, and said at least data to hold is one for which verification processing by said verifying means is not completed.

8. The information recording apparatus as claimed in claim 5, wherein: said control means comprises means for setting a size of said verification storage area so that said size becomes smaller than the recording data storage area.

9. The information recording apparatus as claimed in claim 1, wherein: said recording means records data sequentially in the recording area of the information recording medium.

10. The information recording apparatus as claimed in claim 1, wherein: means for causing the reproducing means to reproduce data after waiting for at least a completion of recording of continuously recordable data of the data in said recording data storage area when a reproduction request is received during the recording state is provided.

11. The information recording apparatus as claimed in claim 1, wherein: means for transferring the data from the recording data storage area to a reproduction request sender when the recording means receives a reproduction request from a recording area to record the data from said recording data storage area during the waiting state is provided.

12. The information recording apparatus as claimed in claim 1, wherein: said control means comprises means for setting a size of said reproduced data storage area so that said size becomes smaller than the recording data storage area.

13. An information recording method comprising: a control step of dividing a storage area of a temporary storage means temporarily storing data in a data recordable information recording medium on the occasion of recording and/or reproduction, into a plurality of areas according to a mode of recording of the data in said information recording medium, wherein:

a recording step of recording data in the recording area of said information recording medium and a reproducing step of reproducing data recorded in the recording area of the information recording medium are provided; and said control step comprises a step of dividing the storage area of said temporary storage means into at least a recording data storage area storing data to record in the information recording medium and a reproduced data storage area storing data reproduced from the information recording medium; and, when a reproduction request is received during recording in said recording step, data reproduced from the information recording medium is stored in said reproduced data storage area in said reproducing step, said recording step comprises a step of keeping a waiting state of waiting before starting data recording until a data occupation amount in said recording data storage area reaches a predetermined threshold, entering a recording state starting the data recording when the data occupation amount exceeds the predetermined threshold, and recording data in the recording area of the information recording medium; and a step of immediately reproducing data in the reproducing step when a reproduction request is received during the waiting state in the recording step, is provided.

14. The information recording method as claimed in claim 13, wherein: said control step comprises a step of storing data in a respective predetermined buffering manner in each area.

15. The information recording method as claimed in claim 13, wherein: said control step comprises a step of storing data in at least one of the respective areas in a ring buffering manner.

16. The information recording method as claimed in claim 13, wherein: said control step comprises a step of storing data in a ring buffering manner in which a ring start pointer and a ring end pointer can be set, and data is stored in the ring buffering manner in at least one of the respective areas with setting the ring start pointer and the ring end pointer.

17. The information recording method as claimed in claim 13, wherein: a recording step of recording data in the recording area of the information recording medium and a verifying step of carrying out verification processing of reproduced data from the recording area after being recorded in said recording step and detecting a defect are provided; said control step comprises a step of dividing the storage area of the temporary storage means into at least a recording data storage area storing data to record in said information recording medium and a verification storage area storing data reproduced by said verifying step; the data to record in the information recording medium is stored in said recording data storage area, and the recorded data reproduced by the verifying step is stored in said verification storage area.

18. The information recording method as claimed in claim 17, wherein: said control step comprises a step of holding the data stored in the recording data storage area until the verification processing by said verifying step is completed.

19. The information recording method as claimed in claim 17, wherein: said control step comprises a step of holding at least data of the data stored in the recording data storage area from among the data stored in said recording data storage area, and said at least data to hold is one for which the verification processing by said verifying step is not completed.

20. The information recording method as claimed in claim 17, wherein: said control step comprises a step of setting a size of said verifying storage area so that said size becomes smaller than the recording data storage area.

21. The information recording method as claimed in claim 13, wherein: said recording step comprises a step of recording data sequentially in the recording area of the information recording medium.

22. The information recording method as claimed in claim 13, wherein: a step of reproducing data in the reproducing step after waiting for at least a completion of recording continuously recordable data of the data in said recording data storage area when a reproduction request is received during the recording state in the recording step, is provided.

23. The information recording method as claimed in claim 13, wherein: a step of transferring the data from the recording data storage area to a reproduction request sender when a reproduction request from a recording area to record the data from said recording data storage area is received during the waiting state in the recording step is provided.

24. The information recording method as claimed in claim 13, wherein: said control step comprises a step of setting a size of said reproduced data storage area so that said size becomes smaller than the recording data storage area.

25. A recording medium recording a program for causing a computer to execute a control step of dividing a storage area of temporary storage means temporarily storing data in data recordable information recording medium on the occasion of recording and/or reproduction, into a plurality of areas according to a mode of recording of the data in said information recording medium, wherein:

a recording step of recording data in the recording area of said information recording medium and a reproducing step of reproducing data recorded in the recording area of the information recording medium are provided; and said control step comprises a step of dividing the storage area of said temporary storage means into at least a recording data storage area storing data to record in the information recording medium and a reproduced data storage area storing data reproduced from the information recording medium; and, when a reproduction request is received during recording in said recording step, data reproduced from the information recording medium is stored in said reproduced data storage area in said reproducing step; and said recording step comprises a step of keeping a waiting state of waiting before starting data recording until a data occupation amount in said recording data storage area reaches a predetermined threshold, entering a recording state starting the data recording when the data occupation amount exceeds the predetermined threshold, and recording data in the recording area of the information recording medium; and a step of immediately reproducing data in the reproducing step when a reproduction request is received during the waiting state in the recording step, is provided.

26. The recording medium recording the program claimed in claim 25, wherein: said control step comprises a step of storing data in a respective predetermined buffering manner in each area.

27. The recording medium recording the program claimed in claim 25, wherein: said control step comprises a step of storing data in at least one of the respective areas in a ring buffering manner.

28. The recording medium recording the program claimed in claim 25, wherein: said control step comprises a step of storing data in a ring buffering manner in which a ring start pointer and a ring end pointer can be set, and data is stored in the ring buffering manner in at least one of the respective areas with setting the ring start pointer and the ring end pointer.

29. The recording medium recording the program claimed in claim 25, wherein: a recording step of recording data in the recording area of the information recording medium and a verifying step of carrying out verifying processing of reproducing data from the recording area after being recorded in said recording step and detecting a defect are provided; said control step comprises a step of dividing the storage area of the temporary storage means into at least a recording data storage area storing data to record in said information recording medium and a verification storage area storing data reproduced by said verifying step; the data to record in the information recording medium is stored in said recording data storage area; and the recorded data reproduced by the verifying step is stored in said verification storage area.

30. The recording medium recording the program claimed in claim 29, wherein: said control step comprises a step of holding the data stored in the recording data storage area until the verification processing by said verifying step is completed.

31. The recording medium recording the program claimed in claim 29, wherein: said control step comprises a step of holding at least data of the data stored in the recording data storage area from among the data stored in said recording data storage area, and said at least data to hold is one for which the verification processing by said verifying step is not completed.

32. The recording medium recording the program claimed in claim 29, wherein: said control step comprises a step of setting a size of said verifying storage area so that said size becomes smaller than the recording data storage area.

33. The recording medium recording the program claimed in claim 25, wherein: said recording step comprises a step of recording data sequentially in the recording area of the information recording medium.

34. The recording medium recording the program claimed in claim 25, wherein: a step of reproducing data in the reproducing step after waiting for at least a completion of recording continuously recordable data of the data in said recording data storage area when a reproduction request is received during the recording state in the recording step, is provided.

35. The recording medium recording the program claimed in claim 25, wherein: a step of transferring the data from the recording data storage area to a reproduction request sender when a reproduction request from a recording area to record the data from said recording data storage area is received during the waiting state in the recording step is provided.

36. The recording medium recording the program claimed in 25, wherein: said control step comprises a step of setting a size of said reproduced data storage area so that said size becomes smaller than the recording data storage area.

* * * * *

UNITED STATES PATENT AND TRADEMARK OFFICE
CERTIFICATE OF CORRECTION

PATENT NO. : 7,613,867 B2
APPLICATION NO. : 10/578707
DATED : November 3, 2009
INVENTOR(S) : Yoshiyuki Sasaki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Nineteenth Day of October, 2010

David J. Kappos
*Director of the United States Patent and Trademark Office*